United States Patent
Aggarwal

(10) Patent No.: US 8,613,108 B1
(45) Date of Patent: Dec. 17, 2013

(54) METHOD AND APPARATUS FOR LOCATION-BASED DIGITAL RIGHTS MANAGEMENT

(75) Inventor: Neerav Aggarwal, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 597 days.

(21) Appl. No.: 12/411,983

(22) Filed: Mar. 26, 2009

(51) Int. Cl.
| | |
|---|---|
| G06F 7/04 | (2006.01) |
| G06F 17/30 | (2006.01) |
| G06F 15/16 | (2006.01) |
| G06F 21/00 | (2013.01) |
| H04N 7/16 | (2011.01) |
| H04L 29/06 | (2006.01) |
| H04W 24/00 | (2009.01) |
| H04M 1/66 | (2006.01) |
| H04M 1/68 | (2006.01) |
| H04M 3/16 | (2006.01) |

(52) U.S. Cl.
USPC ............. 726/29; 726/6; 455/456.1; 455/411; 705/57; 705/59; 707/783

(58) Field of Classification Search
USPC ...................................... 726/6, 29
See application file for complete search history.

(56) References Cited

U.S. PATENT DOCUMENTS

| | | | | |
|---|---|---|---|---|
| 5,243,652 A | * | 9/1993 | Teare et al. ................... | 380/250 |
| 5,905,984 A | * | 5/1999 | Thorsen ........................ | 707/695 |
| 5,919,247 A | * | 7/1999 | Van Hoff et al. .............. | 709/217 |
| 5,943,688 A | * | 8/1999 | Fisher et al. ................... | 711/162 |
| 6,121,924 A | * | 9/2000 | Meek et al. .............. | 342/357.43 |
| 6,324,581 B1 | * | 11/2001 | Xu et al. ........................ | 709/229 |
| 6,357,010 B1 | * | 3/2002 | Viets et al. ......................... | 726/4 |
| 6,381,602 B1 | * | 4/2002 | Shoroff et al. ................. | 707/741 |
| 6,446,093 B2 | * | 9/2002 | Tabuchi ......................... | 715/255 |
| 6,587,857 B1 | * | 7/2003 | Carothers et al. ............. | 707/602 |
| 6,978,366 B1 | * | 12/2005 | Ignatchenko et al. ......... | 713/166 |
| 7,237,123 B2 | * | 6/2007 | LeVine et al. ................. | 713/193 |
| 7,254,588 B2 | * | 8/2007 | Sung et al. ............................. | 1/1 |
| 7,430,760 B2 | * | 9/2008 | Townsend et al. .............. | 726/13 |
| 7,434,048 B1 | * | 10/2008 | Shapiro et al. ................. | 713/165 |
| 7,448,077 B2 | * | 11/2008 | Curran et al. .................... | 726/12 |
| 7,530,093 B2 | * | 5/2009 | Samuelsson et al. ............. | 726/1 |
| 7,533,420 B2 | * | 5/2009 | Battagin et al. ................. | 726/26 |
| 7,584,353 B2 | * | 9/2009 | Risan et al. .................... | 713/164 |
| 7,660,418 B2 | * | 2/2010 | Glick et al. .................... | 380/258 |
| 7,739,583 B2 | * | 6/2010 | Barrus et al. .................. | 715/201 |
| 7,792,297 B1 | * | 9/2010 | Piccionelli et al. ............ | 380/258 |

(Continued)

FOREIGN PATENT DOCUMENTS

CA          2098757 C   *   6/1997

*Primary Examiner* — Carolyn B Kosowski
(74) *Attorney, Agent, or Firm* — Schwegman Lundberg & Woessner, P.A.

(57) ABSTRACT

A method and apparatus for location-based access control applies a location-based identifier to a document, wherein the location-based identifier indicates an original storage location of the document. The original storage location is an authorized node having access privileges specific to the document. In response to the document being moved or copied, an access control engine compares a current location of the document to the original storage location and denies access when there is a discrepancy. When the document is moved consistent with an access control policy, such as when an administrator moves the document, an original storage location identifier is changed consistent with a new location. The document is only accessible when accessed from an authorized location. The locations may be referred to as access nodes, wherein each access node corresponds to a folder.

14 Claims, 18 Drawing Sheets

(56) References Cited

U.S. PATENT DOCUMENTS

| | | | |
|---|---|---|---|
| 7,836,080 B2 * | 11/2010 | DeBie | 707/785 |
| 7,840,802 B1 * | 11/2010 | Shapiro et al. | 713/165 |
| 7,849,100 B2 * | 12/2010 | Brown et al. | 707/783 |
| 7,877,781 B2 * | 1/2011 | Lim | 726/1 |
| 7,933,889 B2 * | 4/2011 | Smetters et al. | 707/708 |
| 7,941,857 B2 * | 5/2011 | Baum-Waidner et al. | 726/23 |
| 7,971,232 B2 * | 6/2011 | Hasbun | 726/2 |
| 8,000,682 B2 * | 8/2011 | Tischer et al. | 455/411 |
| 8,032,542 B2 * | 10/2011 | Reynolds | 707/758 |
| 8,060,535 B2 * | 11/2011 | Mayer | 707/795 |
| 8,087,091 B2 * | 12/2011 | Risan et al. | 726/31 |
| 8,108,916 B2 * | 1/2012 | Fink et al. | 726/6 |
| 8,131,762 B2 * | 3/2012 | Smetters et al. | 707/781 |
| 8,505,107 B2 * | 8/2013 | Lee et al. | 726/29 |
| 2002/0023222 A1 * | 2/2002 | Gefwert | 713/182 |
| 2002/0082997 A1 * | 6/2002 | Kobata et al. | 705/51 |
| 2002/0112178 A1 * | 8/2002 | Scherr | 713/200 |
| 2002/0129000 A1 * | 9/2002 | Pillai et al. | 707/1 |
| 2002/0177449 A1 * | 11/2002 | McDonnell et al. | 455/456 |
| 2004/0046987 A1 * | 3/2004 | Mima | 358/1.14 |
| 2004/0125956 A1 * | 7/2004 | Heiderscheit et al. | 380/258 |
| 2005/0021980 A1 * | 1/2005 | Kanai | 713/182 |
| 2006/0200468 A1 * | 9/2006 | Brown et al. | 707/9 |
| 2007/0025550 A1 * | 2/2007 | Saitoh | 380/1 |
| 2007/0174610 A1 * | 7/2007 | Furuya et al. | 713/167 |
| 2007/0220417 A1 * | 9/2007 | Mathew et al. | 715/511 |
| 2007/0242299 A1 * | 10/2007 | Kobayashi et al. | 358/1.13 |
| 2008/0066148 A1 * | 3/2008 | Lim | 726/1 |
| 2008/0092219 A1 * | 4/2008 | Beckman | 726/9 |
| 2008/0148349 A1 * | 6/2008 | Stevens et al. | 726/2 |
| 2009/0083831 A1 * | 3/2009 | Kanai | 726/1 |
| 2009/0271871 A1 * | 10/2009 | Nied | 726/28 |
| 2010/0146593 A1 * | 6/2010 | Stahl et al. | 726/4 |
| 2011/0196896 A1 * | 8/2011 | Smetters et al. | 707/781 |
| 2011/0258461 A1 * | 10/2011 | Bates | 713/190 |
| 2011/0314551 A1 * | 12/2011 | Turner et al. | 726/26 |

\* cited by examiner

METHOD AND APPARATUS FOR LOCATION-BASED DIGITAL RIGHTS MANAGEMENT

COPYRIGHT

A portion of the disclosure of this document includes material that is subject to copyright protection. The copyright owner has no objection to the facsimile reproduction by anyone, of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright©2008, Adobe Systems Incorporated. All Rights Reserved.

BACKGROUND

To control access to a document, a control policy is often contained in the document, such as the case when access control information is encrypted into the document. The document creator assigns access rights for the document to a set of users. A user having assigned access rights is able to access the document according to the assigned rights. The user may then save the document to a different location, e.g. different folder, at which point the document is re-encrypted as specified by the user. The document may then be moved from one location to another and the original access control information changed or stripped.

BRIEF DESCRIPTION OF THE DRAWINGS

Some embodiments are illustrated by way of example and not limitation in the figures of the accompanying drawings in which.

DETAILED DESCRIPTION

Figure 1:
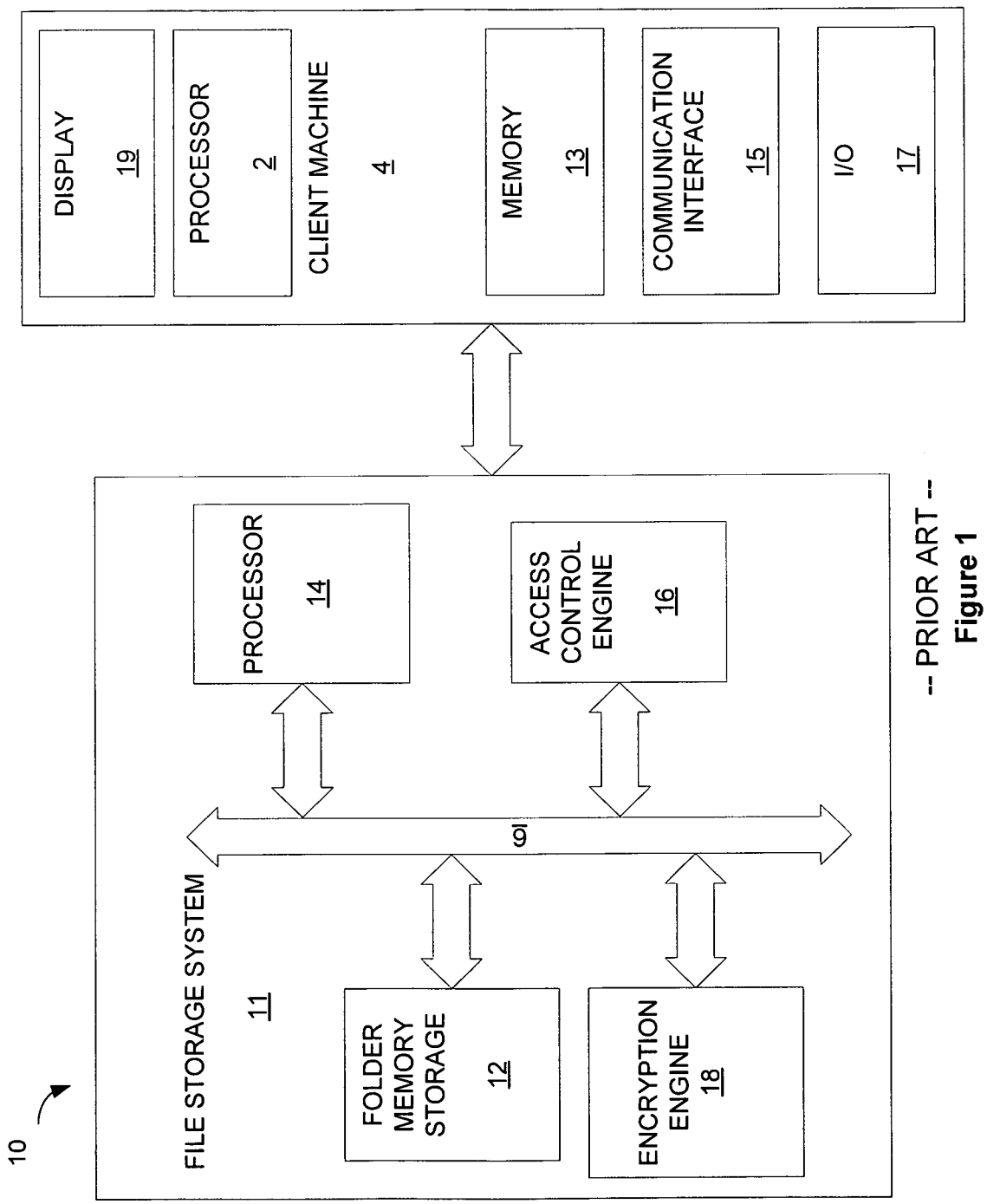
FIG. 1 illustrates a computing environment having a file storage system for storing documents and interfacing with a client machine, according to prior art techniques.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Access control for files stored in a folder organization typically assigns specific access privileges for users to the folder. When a file or document is to be stored in the folder, the document is encrypted to implement the specific access privileges. In this way, only users having access privileges are able to decrypt and access the document. Such a system may be corrupted when a user accesses a document and changes the access privileges for the document. There is a need to avoid corruption of the access control policy implemented for a file storage system.

By providing location-based access control for documents, a user is not able to circumvent the access control policy. Location-based access control applies a location-based identifier to the document, wherein the identifier indicates the original storage location of the document. The original storage location is an authorized node having access privileges specific to the document. When a document is moved or copied, an access control engine compares the current location of the document to the original storage location and denies access when there is a discrepancy. When a document is moved consistent with the access control policy, such as when an administrator moves the document, the original storage location identifier is changed consistent with the new location. The document is only accessible when accessed from an authorized location. The locations may be referred to as access nodes, wherein each access node corresponds to a folder.

FIG. 1 illustrates an example of a typical file storage system 11 in a networked computing system or environment 10, having a folder memory storage unit 12, a processor 14, an access control engine 16, and an encryption engine 18, which together act as a server for controlling access to documents stored therein. A communication bus 6 communicatively couples the various units within file storage system 11. The server functions allocate access control and rights management for the file storage system. The folder memory storage unit 12 is adapted to store documents and data associated with the documents, wherein the documents are organized within folders, each having assigned access privileges. The assigned access privileges are referred to as the access control for the folder, and typically assign rights per user or class of users. For example, a folder may have access privileges defined for specific users, such as Joe Smith, or may have access privileges defined for a class of users, such as all legal staff, etc. The access control thus implements an access control policy. For example, an access control policy for folders storing employee review information may have a private folder, which allows access to human resources personnel, a confidential folder, which allows access to human resources personnel and managers having direct reports, and a public folder, which allows access to all employees. Alternate naming conventions may be used for the folders, and multiple tiers may be implemented. The three-tiered folder organization is provided merely as an example.

Documents are uploaded to the folder memory storage unit 12 by users or an administrator; the administrator typically has privileges superior to those of users, allowing the administrator to assign access privileges to each folder. When a folder is to be stored in the folder memory storage unit 12, the administrator determines a folder by matching the desired access control for the document to the assigned access control of a given folder. For example, if the document is to be read by a first user, referred to as user 1, but no one else, the administrator will locate a folder having read privileges for user 1 and no one else. It is assumed the administrator also has read privileges for the given folder; however, this may not always be the case. When user 1 requests to download the document from the folder, the system encrypts the document consistent with the access control for the folder and specifically for user 1. In this way, only user 1 is able to decrypt the content. This process effectively "bakes" the access control policy into the document, which means that such information is included with content information and stored in the document. This is in contrast to information which may be associated with the document, but is not included in the document as stored. For each document in a folder, the access privileges are specific to the encrypted file. In this way a document encrypted to allow user 1 to read the document will not allow user 1 to write to the document. The same document may be encrypted to allow user 1 to read and write to the document, but this will be a distinct and different encrypted file.

The system 10 may be accessed by a client machine 4, having communication capabilities. The client machine 4 includes memory 13, communication interface 15, and Input/Output (I/O) 17. The memory 13 may be used during access to the system 10 or may be used to store documents for processing when not connected to the system 10. Additionally, the client machine 4 includes a processor 2 for controlling operation of the client machine 4, and a display 19 for graphical user interface and display of information in a user readable format.

As discussed above, access to files is allocated to specific folders so as to allow read, write or other access control by assigning rights per user for each folder. In one scenario, illustrated in FIG. 2, at time T0 an administrator sets up the original folder assignments. In this example, within a computing environment organized having folders 20, 22 and 24, each folder has associated access control assignments. An administrator initializes the system, which may include creating specific folders, and assigns access control to each folder.

In the present example, the administrator sets up three folders: private folder 20, confidential folder 22 and public folder 24. Access control for private folder 20, confidential folder 22 and public folder 24 specifies the administrator has "full control," meaning the administrator can read from and write to files contained or stored therein. The ability to read from and write to files includes the ability to move, copy, and edit files. While no other user has access privileges for private folder 20, two users have access read confidential folder 22, identified as user 1 and user 2. Similarly, user 1 has read and write access privileges for public folder 24, and user 3 has read access privileges for public folder 24. Note, user 2 has no privileges for public folder 24, and user 3 has no privileges for confidential folder 22. In one example, the administrator first creates the folders and assigns privileges to each folder. Such privileges may be considered rules defining access to the contents of each folder as well as rights and privileges associated with use of the contents of each folder. The administrator may assign privileges within a file storage system 11 through access control engine.

The administrator's allocation of access rights to each folder is stored in an Access Control List (ACL), which identifies all of the users and their associated privileges. There is an ACL for each folder. The ACL provides specific information to both the encryption engine 18 (FIG. 1) and the access control engine 16 (FIG. 1) to encrypt and provide documents from the various folders to requesting users. The ACL may be used to determine which documents are viewable by a given user.

Figure 2:
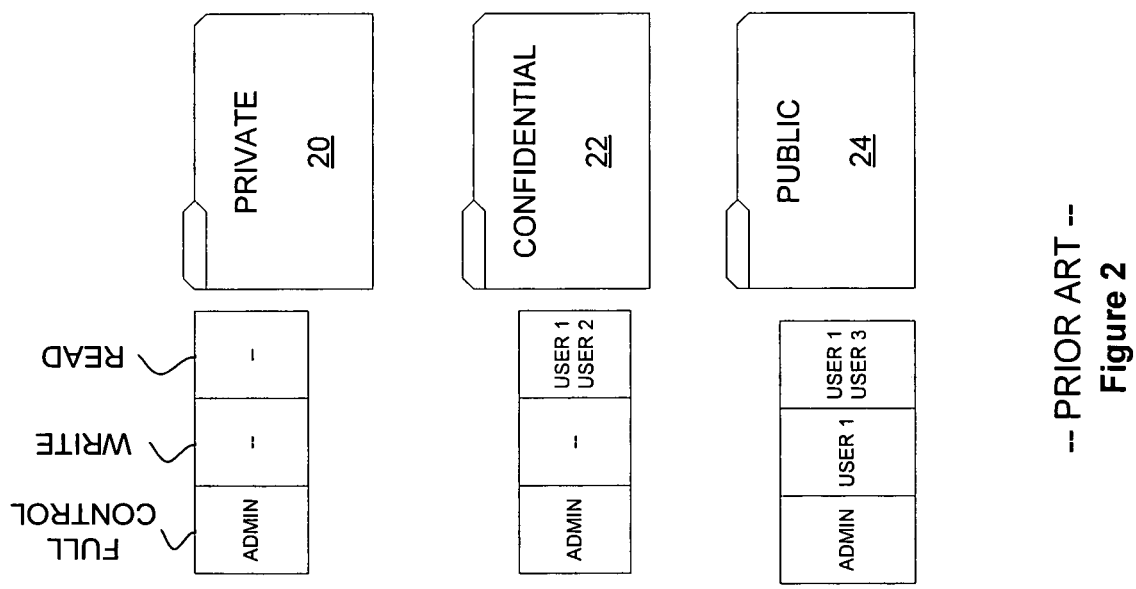
FIGS. 2-4 illustrate application of an access control policy, according to prior art techniques.
Figure 3:
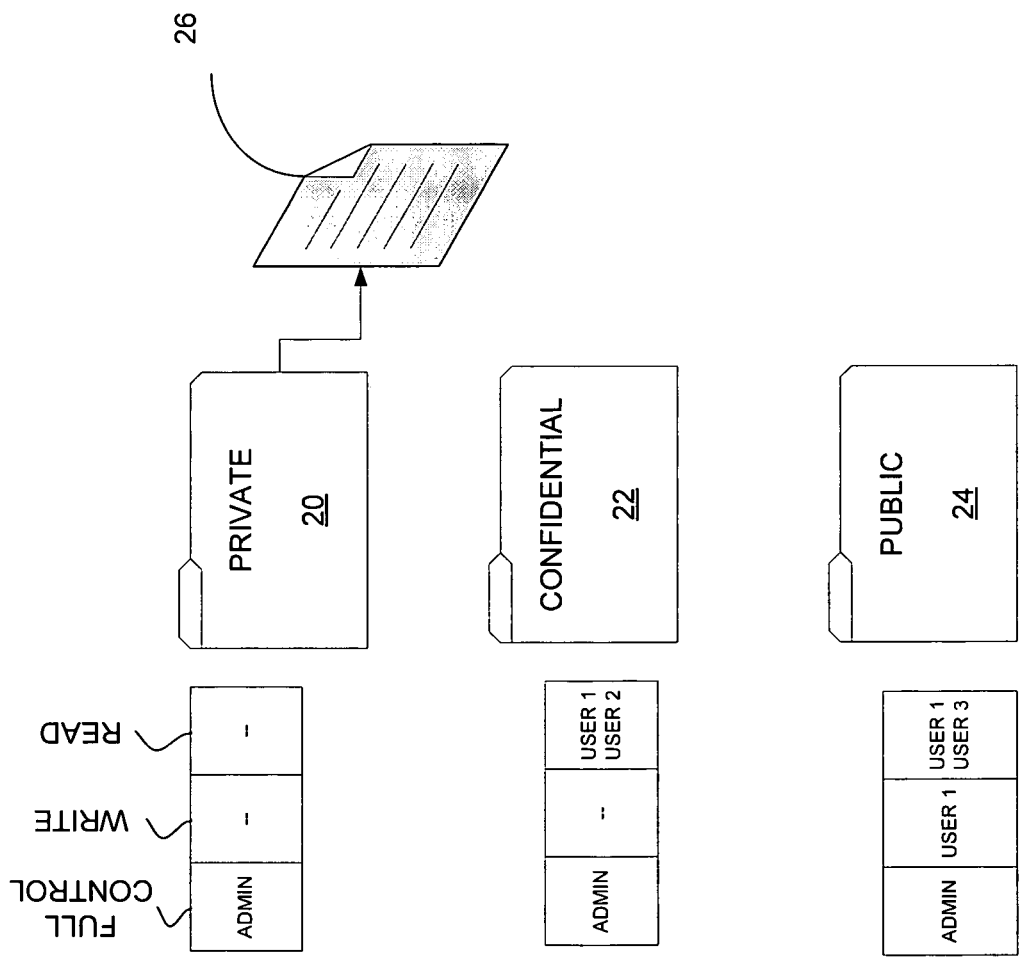

Continuing with the access control policy established as in FIG. 2, at time T1 illustrated in FIG. 3, the administrator creates and stores a document 26 to the private folder 20. As stored in private folder 20, users 1, 2 and 3 do not have access privileges to the document 26. In one example, users 1, 2 and 3 are not able to view document 26; in another example, they are able to view the document, but are not able to open the document, as access control engine 16 (FIG. 1) will deny access, wherein viewing means the user is able to see that the document exists within private folder 20, but is not necessarily able to view the contents of the document. For example, files and folders within private folder 20 may be presented as a list of files and folders or may be presented as file and folder icons which are viewable by users having the appropriate privileges and according the control policy enforced by access control engine 16. For example, files and folders within private folder 20 may be presented as a list of files and folders or may be presented as file and folder icons which are viewable by users having the appropriate privileges and according the control policy enforced by access control engine 16.

If any of users 1, 2 and 3 are able to download a copy of the document, it would have been encrypted for the administrator, and therefore, they would not be able to decrypt the document.

Figure 4:
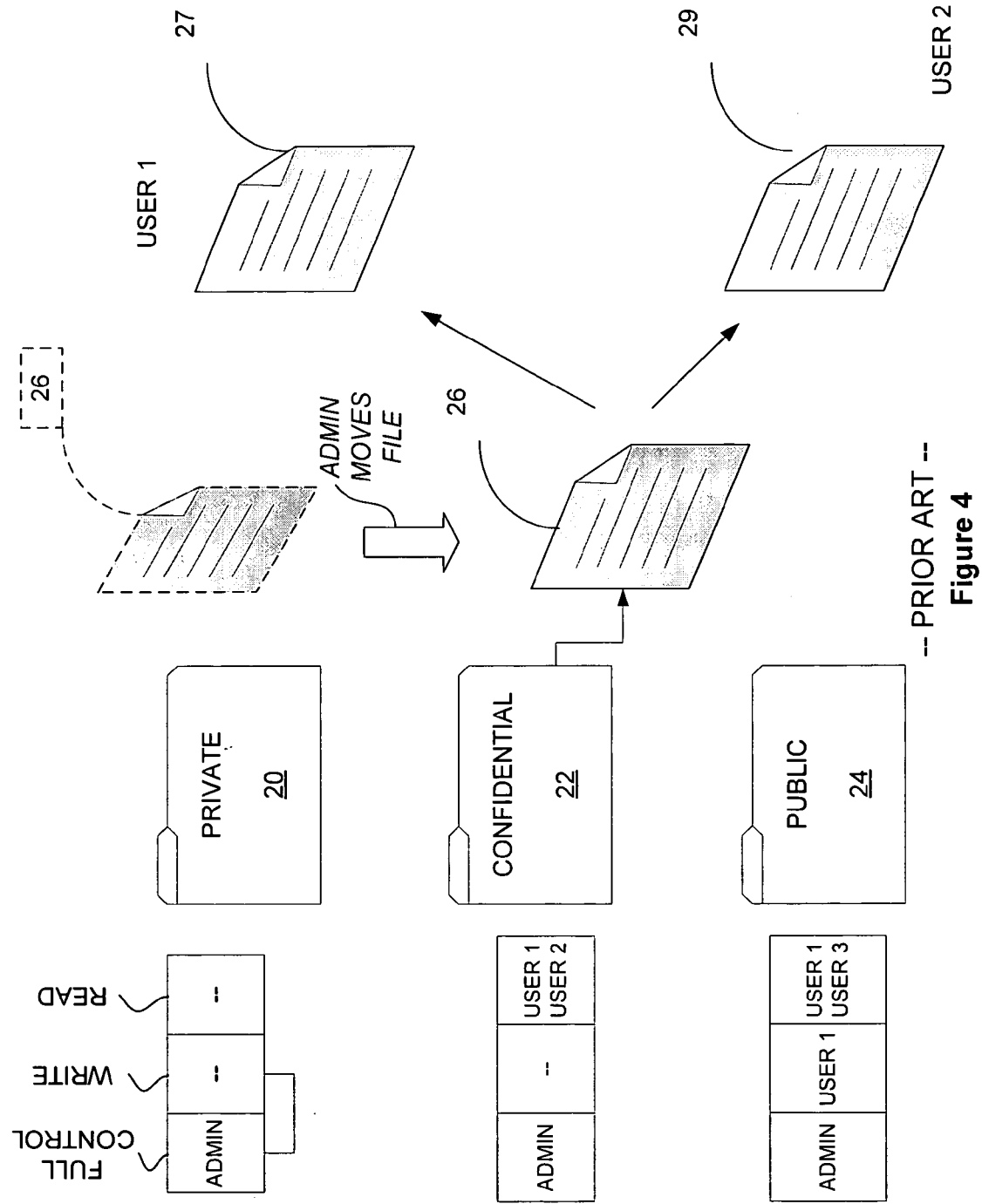

At time T2, the administrator moves document 26 to confidential folder 22, as illustrated in FIG. 4, where document 28 is a copy of document 26. The confidential folder 22 allows the administrator full privileges, and allows users 1 and 2 read access. The document 28 is stored in the confidential folder 22. In one example, the stored document 28 is the same as the stored document 26, although each is encrypted differently when downloaded, wherein the encryption is specific to the downloading entity. When the administrator accesses the document 28, the file storage system 11 (FIG. 1) encrypts the document for the administrator to access. The encryption information is available to the file storage system 11 during the initial allocation of access control privileges, or rights, by the administrator to the folders. The file storage system 11 has identification information for the administrator and each or users 1, 2 and 3. To provide document 28 to a requester, processor 14 (FIG. 1) and encryption engine 18 (FIG. 1) encrypt document 26 according to an access control policy evidenced by the access privilege assignments for the folders. When user 1 requests document 28 from folder confidential folder 22, file storage system 11 encrypts the document for user 1; similarly, when user 2 requests document 28 from folder confidential folder 22, file storage system 11 encrypts the document for user 2. User 1 is not able to decrypt the document encoded for user 2, and vice versa. In other words, each encrypted copy is encrypted for a specific requester. Once a requested document is decrypted, however, the document may be saved to client machine 4 and distributed without encryption.

As in FIG. 4, when user 1 attempts to access document 28, e.g. tries to open document 28, access control engine 16 verifies user 1 has the attempted access privileges; and encryption engine 18 (FIG. 1) encrypts document 28 specifically for user 1 resulting in encrypted document 27. User 1 is able to decrypt document 27 and access the content contained therein. If user 1 stores a decrypted copy of document 27 on a local machine, such as client machine 4, the copy is not encrypted and may be distributed to others without access privileges to confidential folder 22, such as user 3. When user 2 attempts to access document 28, access control engine 16 verifies user 2 has the attempted access privileges; and encryption engine 18 encrypts document 28 specifically for user 2 resulting in encrypted document 29. User 2 is able to decrypt document 29 and access the content contained therein. If user 2 stores a decrypted copy of document 29 on a local machine, such as client machine 4 (FIG. 1), the copy is not encrypted and may be distributed to others without access privileges to confidential folder 22, such as user 3.

When user 1 downloads document 28, an access control policy is applied by file storage system 11, which uses the ACL for confidential folder 22 and indicates that user 1 has read privileges for confidential folder 22. Similarly, when user 2 downloads document 28, an access control policy is applied using the ACL information, which indicates user 2 has read privileges for confidential folder 22. In other words, each time a document is requested, an access control policy is applied specific to the requester. In this way, the privileges are controlled at the client machine, by software resident or operating on the client machine or client computing environment. For example, when a user downloads a document, the client machine receives the ACL for the document from the server managing the folders. The client machine then enforces the ACL for the document for this user. As an example, a document may be downloaded to a client machine, wherein the ACL indicates the document may be opened for viewing, but not available for editing, adding comments or printing. The client machine then allows the user to view the document, but not to edit, add comments or print. Alternate embodiments may apply control in coordination with the server, or implement another mechanism to enforce the ACL.

To overcome the potential for unauthorized access to a document, a computing environment provides location-based access control or digital rights management of documents and files. At creation of a document, or when an administrator or other user first uploads a document to a computing environment, the system determines and applies Access Control Rights (ACR) specific to the location of the server. These ACRs instruct the system, such as an application program, to verify with the server's Access Control Management (ACM) for the rights and privileges associated with the document. An ACM may include a Content Services (CS) authorizer and a Rights Management (RM) server. Such verification assures that only authorized users can access the document. When an authorized user saves the document to another location, such as to another folder having different access control privileges, the ACR associated with the document does not change, but still refers to the location-based server's ACM. To access a document, a user sends a request to the server where the document is stored. When a request is received at the server, the file storage system 51 (FIG. 5A) compares the original node identifier to a node identifier associated with a current storage location of the document. If the two identifiers are consistent, the requester is an authorized user or authorized requester, and the document is downloaded in response to the request along with the ACL and encryption information. If the two identifiers are not consistent, then access to the document is denied.

Figure 5A:
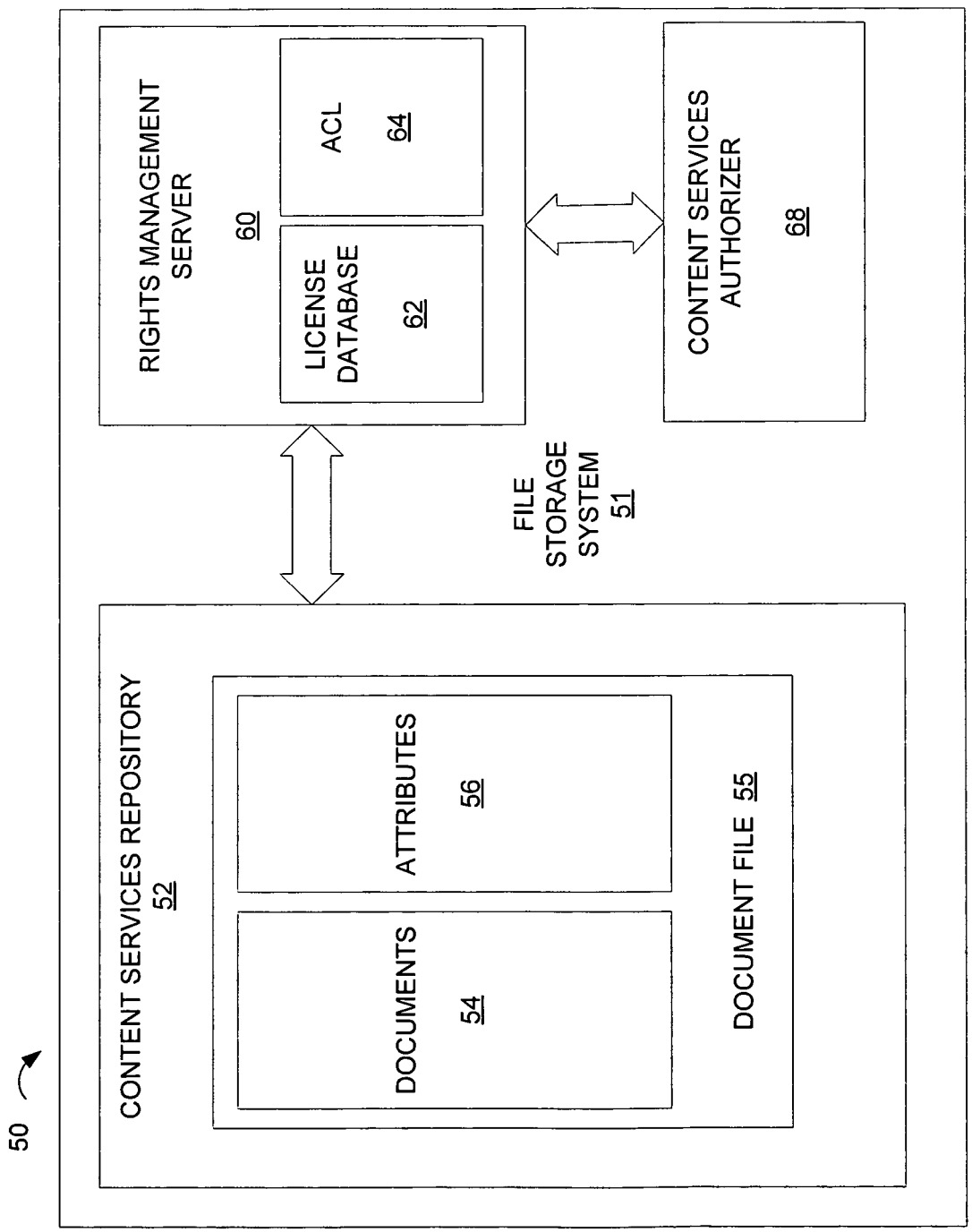
FIG. 5A illustrates a file storage system, according to an example embodiment.

An example embodiment of a file storage system in a computing environment 50, illustrated in FIG. 5A avoids corruption of an Access Control Policy (ACP) as in a typical file storage system. As illustrated, a file storage system 51 operates within computing environment 50, and contains CS repository 52 which includes documents 54 and attributes 56. The document and files stored in documents 54 includes payload information, CS policy and license identifiers as well as server ID information.

Figure 15:
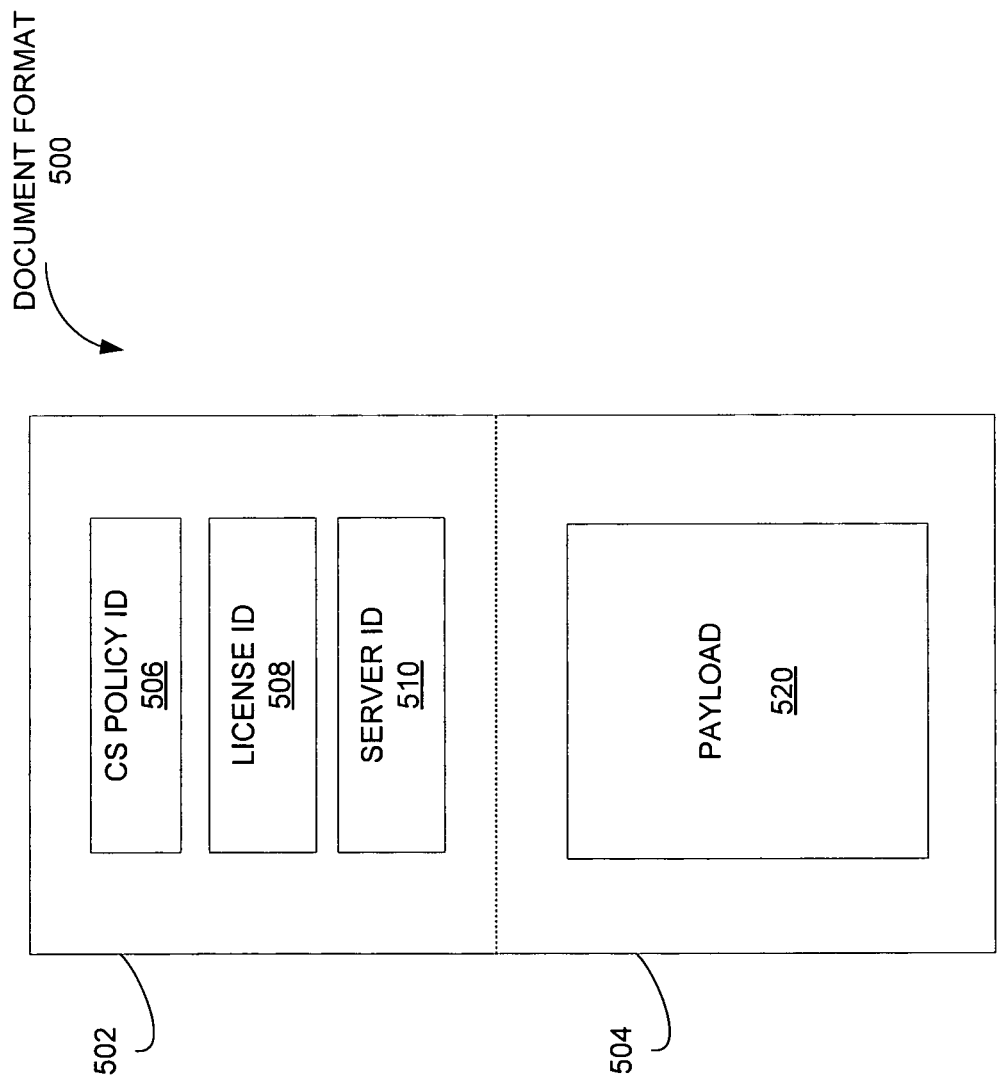
FIG. 15 illustrates a location-based digital rights management document format, according to an example embodiment.

Referring back to FIG. 5A, CS repository 52 operates in coordination with RM server 60 and CS authorizer 68. RM server 60 further includes license database 62 and ACL 64. RM server 60 stores license information and encryption information, and RM server 60 provides this information to an authorized requester. In this way, RM server 60 stores information to implement ACP rules, and CS authorizer 68. The RM Server functions to associate the license ID and policy ID with the CS authorizer 68. Further, RM server 60 includes logic to authenticate users, fetch user identification (user id) and pass to CS Authorizer. The RM Server 60 also has auditing capabilities and can audit user actions, such as when a user opens a document, closes a document, or prints a document. An example of a document format is illustrated in FIG. 15 and discussed herein below. Alternate embodiments may include other document identification information used to map the document payload or content to attributes associated with the document payload. Attributes are properties associated with content. Some attributes are created by the system, and are considered standard attributes; other attributes are created by the administrator, and are considered custom attributes. Examples of standard attributes may include node ID, size, creation date, modified date, created by, last modified by, description, and others.

In the current context, custom attributes include license ID and original node ID of the document, which Values associated with attributes are indexed in the system so that content can be searched later on with these attributes.

Each document is stored in a document file 55, which includes document information contained in documents 54 and information associated with the document in attributes 56. Attributes 56 includes information associated with each document. An attribute includes information relating to an access location and access policy specifics. Attributes may be considered as properties or metadata or content. Examples of possible attributes include, but are not limited to, node identifier (node ID), document size, document creation date, document modification date, document creator or author, document modification creator or author, document description, as well as other document descriptors. For each document, the associated attributes include an original access location, or original node. The original node indicates the authorized access node for the document. The node may be a folder in a folder organization of a file storage system, such as file storage system 51, or may be a location in a network, such as IP address of a document or webpage.

Figure 5B:
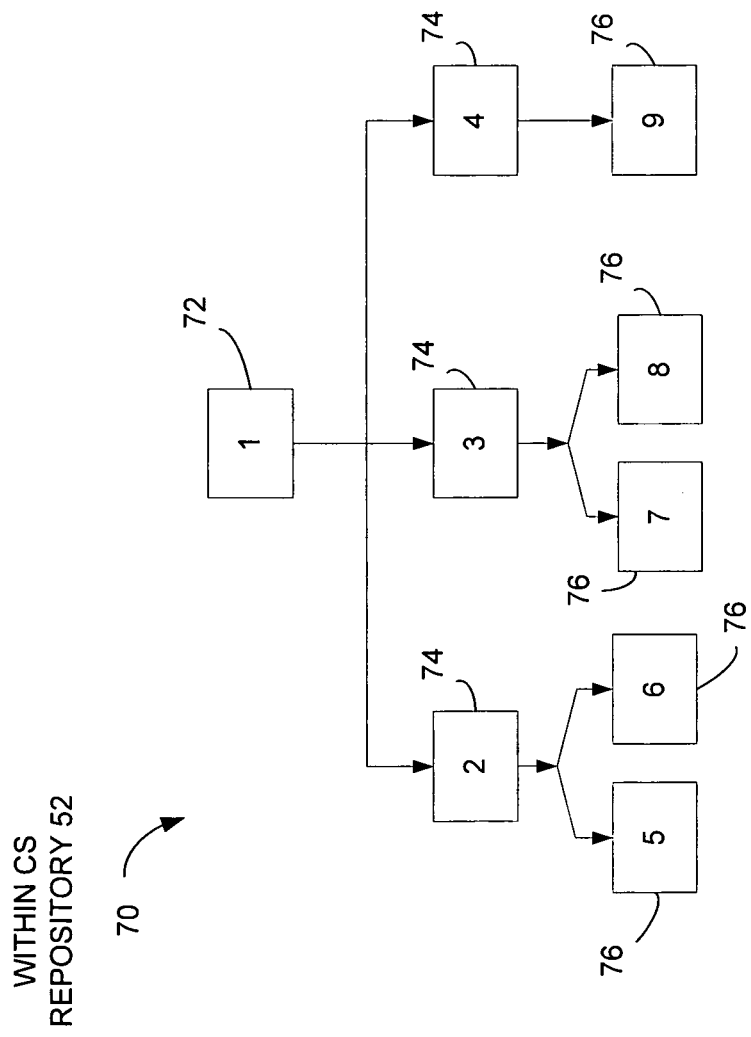
FIG. 5B illustrates a hierarchical tree structure representing nodes in a content storage system according to an example embodiment.

In one example, CS repository 52 stores content in a hierarchical tree structure such as tree 70 of FIG. 5B. Each unit 72, 74, 76 in this tree is called a node, wherein each node has the following attributes (or properties):

1. node identifier (node ID), wherein the node ID is unique for a given node. In other words, no two nodes in the system have a same node ID. In one example, the node ID is a Universally Unique Identifier (UUID), commonly referred to as a uuid. A uuid is used in software construction and is intended to enable distributed systems to uniquely identify information with little coordination, and to avoid inadvertent use by another for a different node.
2. parent, wherein each node has a parent, which may be a folder or another node. As used in a hierarchical tree structure, a parent node has subordinate nodes, referred to as children.
3. node type, identifying the node contents, such as a folder or content stored in the folder.

Returning to FIG. 5B, the tree 70 in one embodiment is a hierarchical arrangement of nodes. These nodes can exist at any level of the tree 70, wherein a top level node 72 is referred to as a root node. The root node 72 is a parent to nodes 74. The root node 72 may be a folder or may be a directory or drive. Each of the nodes 74, in the present example, is also a folder. The tree 70 also includes nodes 76, which are referred to as leaves as each is at the end of a branch and has no children. Each of the nodes 76 has a parent node 74, and each of the nodes 74 have parent node 72.

Each node is described by multiple attributes, wherein the attributes are determined on creation of a node, such as creation of a folder or on moving content into a folder. For example, when content is uploaded to the CS repository 52 a node is created having a node ID, parent and node type attributes. As content is used, processed and moved or copied to other locations, the attributes may change. When content moves from one location to another, such as by a cut and paste procedure, the node id for the content remains unchanged. When content is copied from one location to a different location, however, the system generates a new node id but retains other attributes without change.

Other attributes may change when nodes are processed. For example, when a document is encrypted and stored in CS repository 52, an additional new attribute is generated, which is referred to as "original node ID." Initially, the original node ID attribute is the same value as the node ID. When the encrypted document is moved to another location, the attributes for node ID and original node ID remain the same. When the encrypted document is copied to a new location, the node ID attribute changes, but original node ID attribute remains the same. The dissimilar treatment of the various attributes allows for location-based access control.

When a document is created and first stored in a specific folder, access control privileges of the folder are applied to the new document. Access control privileges are also documented in the ACL, which provides rules for applying an ACP.

Figure 6:
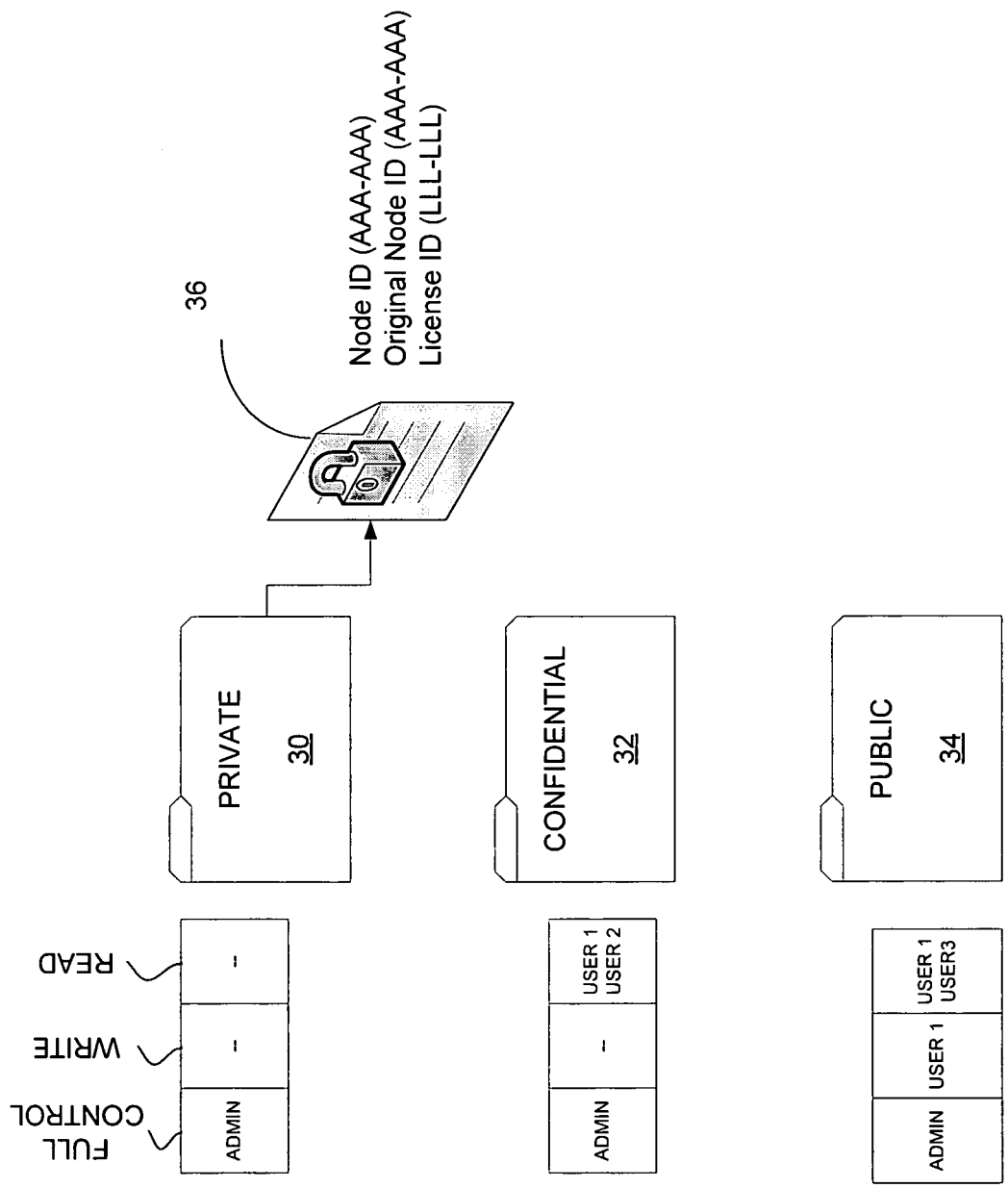
FIGS. 6-9 illustrate application of location-based digital rights management, according to an example embodiment.

Continuing, FIG. 6 provides an example application of location-based DRM for a document. As used herein, an ACP is used to implement DRM for documents and files. Here, the administrator has placed the same access control privileges on three folders in a file storage system, wherein the administrator has full access to private folder 30, confidential folder 32 and public folder 34. User 1 has read access to confidential folder 32. User 1 has read and write access to public folder 34. User 2 has read access to confidential folder 32; and user 3 has read access to public folder 34. At time T0, the administrator uploads a document to private folder 30, where only the administrator has access privileges. In this example, users 1, 2 and 3 are not able to view or access files in private folder 30. CS authorizer 68, within file storage system 51 (FIG. 5A), applies an ACP specific to the location of document 36 by applying the ACP for private folder 30 to document 36.

In one example, the CS repository 52 (FIG. 5B) is organizationally and functionally similar to a file and folder storage system. The CS repository 52 also may provide a web interface to enable users and the administrator to browse through folders and download files. This example does not use an additional file storage system.

Application of the ACP involves storing access control information in document 36, as well as storing associated access control information in CS repository 52. The information remains with document 36 and is not extracted or removed when document 36 is moved or copied to another location. In the example of FIG. 6 a lock identifies inclusion of access control information within document 36. Attributes of document 36 include an original node ID for an authorized location of document 36 and a node ID indicating the location at which document 36 is accessed. When document 36 is first stored in private folder 30, such as document 36, a node ID is set to the original node ID. In an alternate embodiment, the node ID is not set or configured until a first attempt to access document 36. In an example embodiment, the administrator determines the authorized node or nodes. Alternate embodiments may implement other rules or criteria for identifying an authorized node, such as an automated process on creation of a document, or other scheme. Additionally, alternate embodiments may include a mapping, such as stored in a look up table, to find a corresponding authorized node or nodes.

The location-based control techniques, and specifically DRM and other access controls may be implemented in other types of content management systems. The basic concepts are implemented wherein a content management system provides a unique identifier for each node, e.g. folder and content. Where a content management system allows addition of custom attributes, the original node ID or other attribute allowing location tracking of content facilitate location-based controls. Additionally, where a system differentiates attribute modification for changes in movement of documents, such as maintains an attribute value when content is moved, while modifying that attribute value when content is copied, location-based control techniques are applicable. Ideally, any system having the following properties may implement location-based rights management, such properties including facility to:

1. provide a unique identifier for each content item.
2. support addition of custom attributes.
3. maintain an attribute of content for a first type of content processing, while changing the attribute for a second different type of content processing.

As illustrated in FIG. 6, the ACP applies an original node identifier, or original node ID, to document 36 in the format AAA-AAA. The node identifier of the current node, or node ID, is the same value, as this is the initial storage location. The license identifier, license ID, is given as LLL-LLL. The original node ID, the node ID and the license ID are stored as attributes of document 36 in the CS repository 52. By applying location-based DRM, which embeds ACP information in document 36 and in CS repository 52, file storage system 51 stores an encrypted version of document 36. Specifically, document 36 is not encrypted when an attempt to access is made by a user; and document 36 is not encrypted for a specific user.

When a user attempts to access document 36, RM server 60 (FIG. 5A) provides information sufficient to allow the requesting user to decrypt document 36. In this process, detailed further herein below, a user requests access to a document by sending user credentials to RM server 60. Once user credentials are verified and if the original node ID matches the node ID, the RM server responds to the requester with encryption information, such as encryption keys, and ACL information for application of ACL rules by the user. The encrypted version of document 36 is stored in file storage system 51 including a payload containing content, a server identification, or server ID, and the license ID. The server ID is the location of the server, such as the URL of the server, containing an IP address of the server and a port location. The server, in this example, is the RM server 60 of FIG. 5A. Additionally, document 36 may include a CS policy name as well. Server ID, license ID and CS policy name are not encrypted with the content of document 36, but rather are accessible when downloaded to a requester.

When the administrator requests document 36, the file storage system 51 will download the document to the administrator. The administrator retrieves the server ID and sends a request to access the document to the identified server. To open the document, the administrator sends user credentials and a document identifier, which are verified against the ACR. When a document is encrypted via RM server 60, a license ID is generated, which is associated with a RM Policy (RMP). The license ID is "baked" into the document along with the server information; meaning the license ID and server ID are appended to the payload of the content. In one example, the information includes a server URL containing server's IP address and port. When a document is opened within the client software environment, the client machine reads the license ID and server ID and sends them to the RM server 60. In response, the RM server 60 looks up the policy using the license ID. Since each policy is configured to evaluate the ACL based on the location of the document, the document is searched in the repository using license ID. As discussed above, the license ID is stored as a custom attribute associated with content in CS repository. The attributes of content are indexed allowing search using license ID.

Here, the administrator is an authorized user, and a request to access document 36 in private folder 30 is an authorized request. The file storage system 51, and the RM server specifically, sends ACL and encryption information, such as keys, to decrypt the content to the administrator.

Figure 7:
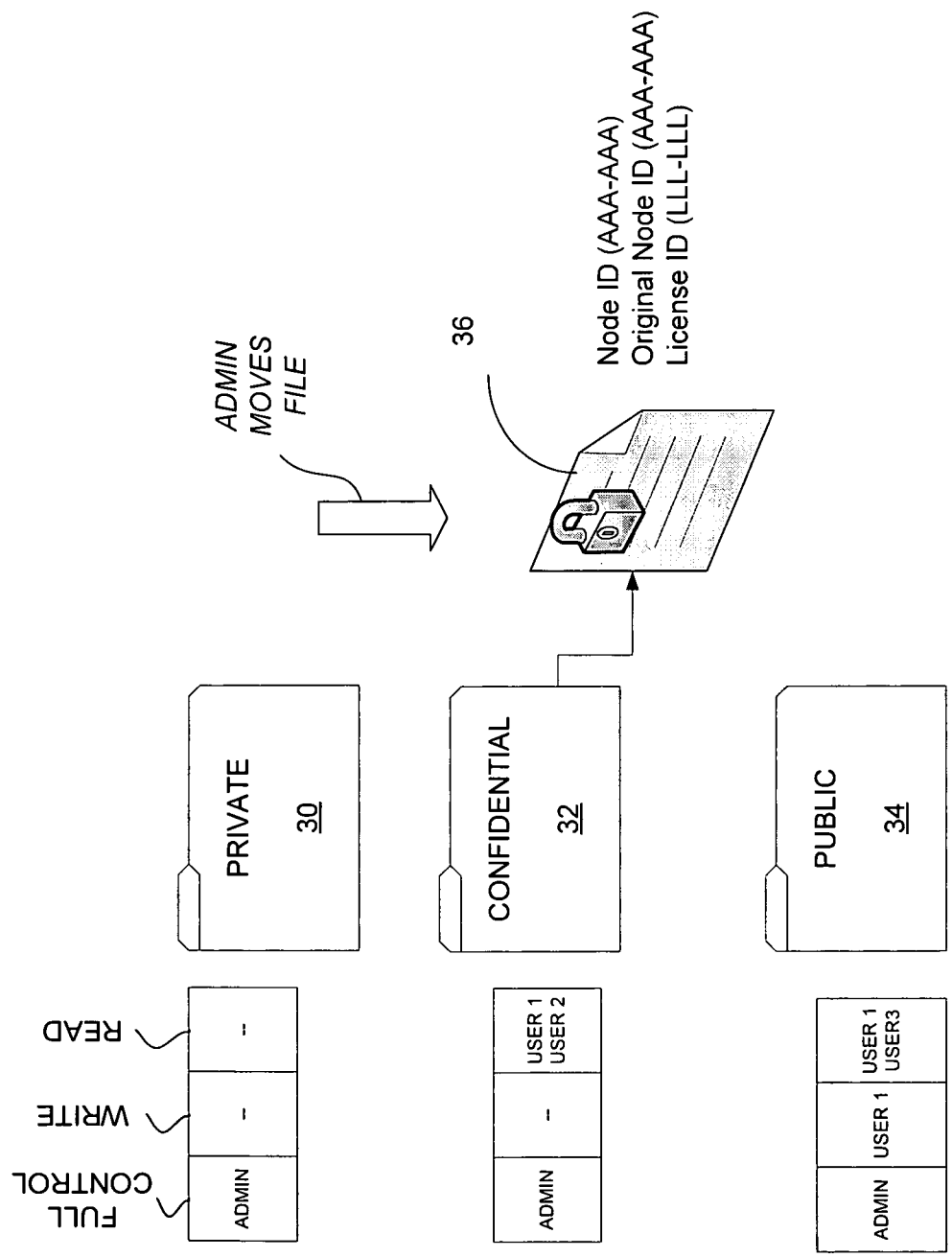

At time T1, illustrated in FIG. 7, the administrator moves document 36 to confidential folder 32. As the administrator moved document 36, the administrator has decided to change the ACRs associated with document 36. Here the ACRs and ACL reflect the access privileges of confidential folder 32, referred to as the ACP. The document movement by the administrator does not change the original node ID or the node ID. As document 36 is stored in confidential folder 32, users 1 and 2 have read access privileges to document 36. Access to document 36 involves checking requester credentials and verifying the document is requested from an authorized node. Note: if user 3 requests access to document 36, the file storage system 51 denies access as user 3 is not on the ACL for confidential folder 32. This is true, even though the node ID matches the original node ID. As discussed with respect to FIG. 8, any copy of document 36 moved by other than the administrator will result in inconsistencies in the original node ID and the node ID, and therefore, denial of access to document 36. As used herein, the original node ID, node ID and license ID format are examples; alternate formats and identifiers may be used to verify authorized document location and to associate a license to a document.

Figure 8:
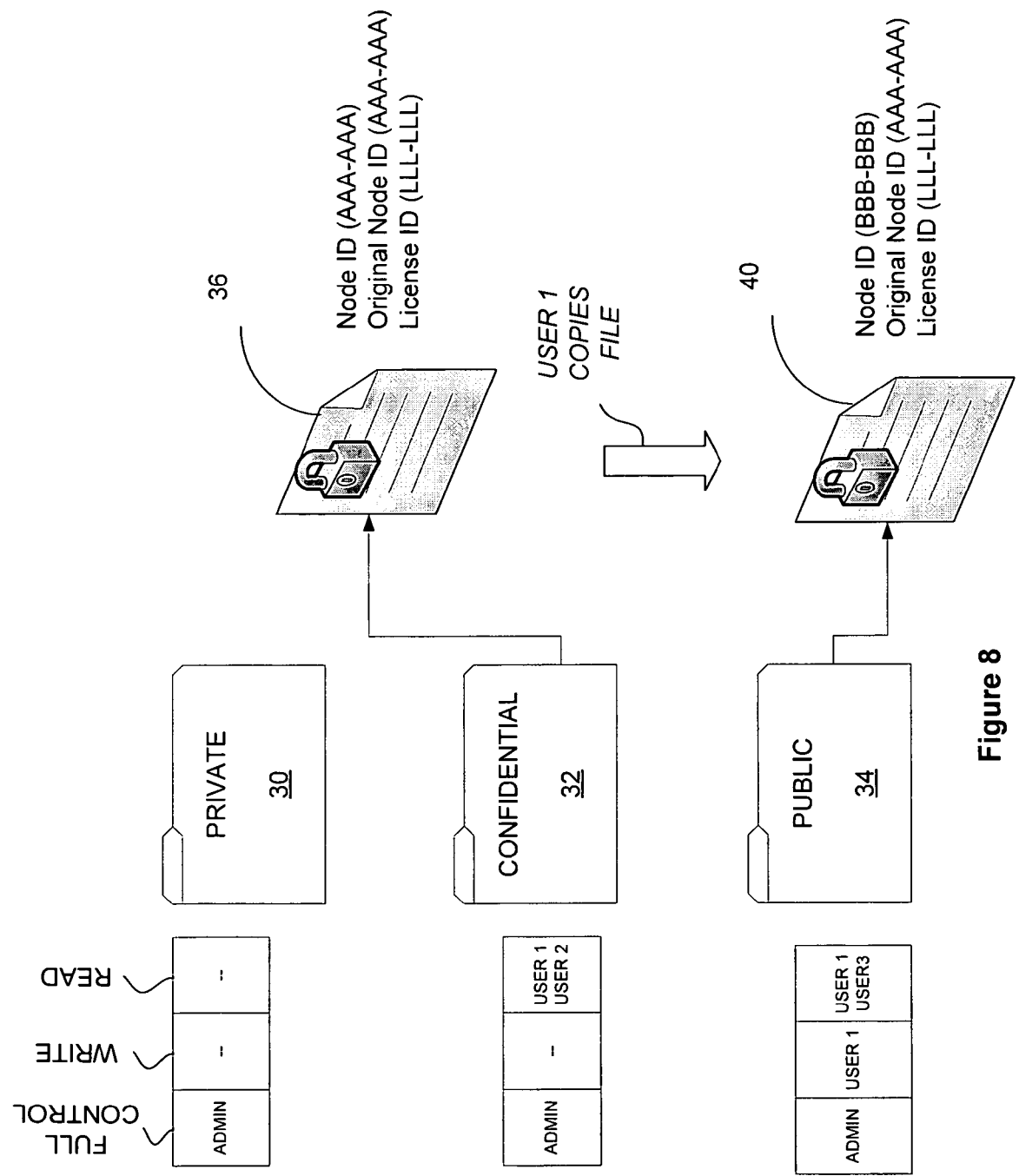

At time T2, illustrated in FIG. 8, user 1 copies document 36 from confidential folder 32 to public folder 34. Note, in the present example user 1 does not have authority to copy or move document 36 from confidential folder 32. Therefore, any document movement, or copy, will result in an inconsistency between original node ID and node ID of the document. As illustrated in FIG. 8, copying document 36 to public folder 34 results in a new document 40 stored in public folder 34, having original node ID AAA-AAA, but node ID BBB-BBB, while the license ID LLL-LLL remains unchanged.

Specifically, to make a copy, user 1 first downloads document 36 and requests access to file storage system 51 (FIG. 5A). User 1 is an authorized requester to document 36 from confidential folder 32, the node ID and the original node ID are consistent; and therefore, RM server 60 (FIG. 5A) sends ACL information and encryption information to user 1. The client machine sends the license ID and user's credentials. The RM server 60 then responds by either allowing the access request or denying the access request. When allowed, the RM server 60 sends the applicable permissions with the decryption key. The applicable permissions instruct as to what the user has privileges to do with the document, e.g. open, add comments, copy content, etc. Note, in the present embodiment for user 1 to access document 36, user 1 is working from a local client machine, such as client machine 4 of FIG. 1. On receipt of ACL information and encryption information, user 1 decrypts and opens document 36. The client machine includes a local application to access document 36, wherein the local application applies the encryption information to decrypt document 36. Note: the local application may invoke encryption or decryption functions from another application. User 1 is then able to access the decrypted, or unencrypted, version of document 36 according to application of ACL information associated with document 36.

The local application applies ACL information to govern and control use of document 36 by user 1. For example, where the ACL information identifies read access privileges, but not write access privileges for user 1, the local application will prevent user 1 from write access to document 36. In one embodiment, however, user 1 may make a copy (document 40) of unencrypted document 36. Saved copy document 40 has the same original node ID, but has a different node ID as user 1 is not authorized to move or copy document 36 to a different location than confidential folder 32. When user 1 stores document 40 in public folder 34, document 40 similar to document 36. The CS repository 52 (FIG. 5A) stores the encrypted document in documents 54 (FIG. 5A), and stores the original node ID and node ID in attributes 56 (FIG. 5A).

While user 1 has access privileges for public folder 34, when user 1 attempts to access document 40, CS authorizer 68 (FIG. 5A) will identify an inconsistency between the original node ID and node ID, and will prevent RM server 60 (FIG. 5A) from sending encryption information to user 1. In the present example, document 36 and document 40 are the same, and differ only in their locations. In this case, not even user 1 will be able to access document 40, as the original node ID and the node ID are not consistent. User 3 also has access privileges for public folder 34, but is also prevented from accessing document 36 due the inconsistency of information, i.e., original node ID and node ID inconsistency.

In the present example, document 40 is a copy of document 36 created by user 1. Therefore, if another user downloads document 40, the ACL evaluation is done for the location of document 36. In this way, a user having access to document 40, but having no access to document 36, is able to download document 40 but is not permitted to open document 40. Specifically, user 3 is able to download document 40, having read privileges for public folder 34, but is not able to open document 40 as user 3 has no privileges for confidential folder 32 where document 36 is located. Similarly, user 1 is able to download document 40 from public folder 34, but is not able to open document 40, even though user 1 has read and write privileges for public folder 34. The node ID and the original node ID are not consistent and therefore, access is denied even to user 1. In one example, user 1 is able to download and process document 40 using privileges allowed for user 1 at the original node, i.e. open and read privileges. User 1 only has read privileges on the document and does not have "write" privileges on the document even though user 1 has read and write privileges for public folder 34 as the ACL evaluation would take place via folder 32.

Figure 9:
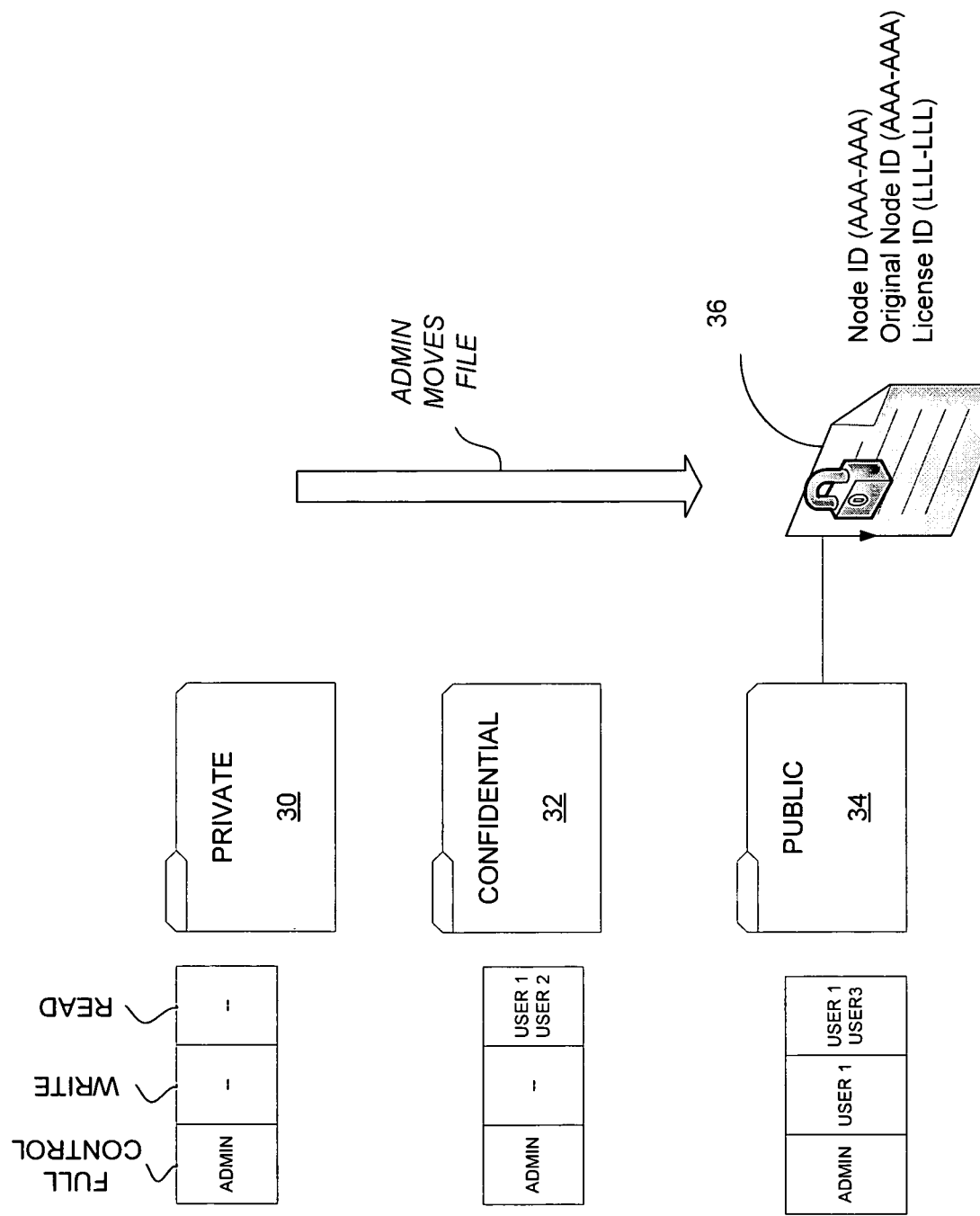

As another example, at time T3, illustrated in FIG. 9, the administrator moves file 36 from private folder 30 to public folder 34, where document 36 is now stored. As the administrator is moving document 36 from one location to another, the original node ID and node ID are not changed. As the location of document 36 has changed, the original node ID identifies the location of document 36. Specifically, as public folder 34 is now an authorized location for the document, the node ID of public folder 34 is set equal to the original node ID.

In the various scenarios of FIGS. 6 to 9, the document 36 is encrypted once when uploaded by the administrator. Subsequent access control uses verification with the server that a requester is authorized to access a document from a specific location and verifies the authorization node of the document 36. In the examples presented, verification checks for consistency between an authorized node or nodes, and an access node. Alternate embodiments may verify authorization node in other ways, such as by keeping the association of a document's location with the document in a database table and synchronizing this table whenever the document location is changed. This location-based DRM for documents and files prevents copy based spreading of documents in circumvention of DRM techniques.

A rights management policy defines usage rights (e.g. open, print, commenting, content extraction etc) to the users. There is a mechanism in RM by which a developer can delegate the usage rights evaluation to a separate custom component (called authorizer). Content Services Policy (or CS Policy) is configured to evaluate usage rights thru a custom authorizer (called CS Authorizer). This CS authorizer evaluates the usage rights on the basis of access permissions user has on the document in CS repository.

When CS policy is applied to a document, it gets encrypted and a license ID is generated for the document. The license ID is stored at the RM server 60 and in the CS repository 52 (FIG. 5A) as a document attribute. The encrypted document contains following:
1. license ID,
2. Server Information (this contains complete URL of the server from where the document is encrypted e.g. https://www.adobe.com)
3. Encrypted Content.

The RM server 60 maintains an association between the license ID and the corresponding CS policy.

The license ID and server information are un-encrypted in the document. When a document is opened inside a client application or software at the client machine, the client application uses the document information to connect to the RM server 60, such as using the server URL, and checks if anonymous access is enabled. When anonymous access is not enabled the RM server 60 prompts the client application to enter user credentials. The client application sends these credentials along with the license ID to the RM server 60, which verifies the credentials.

Figure 10:
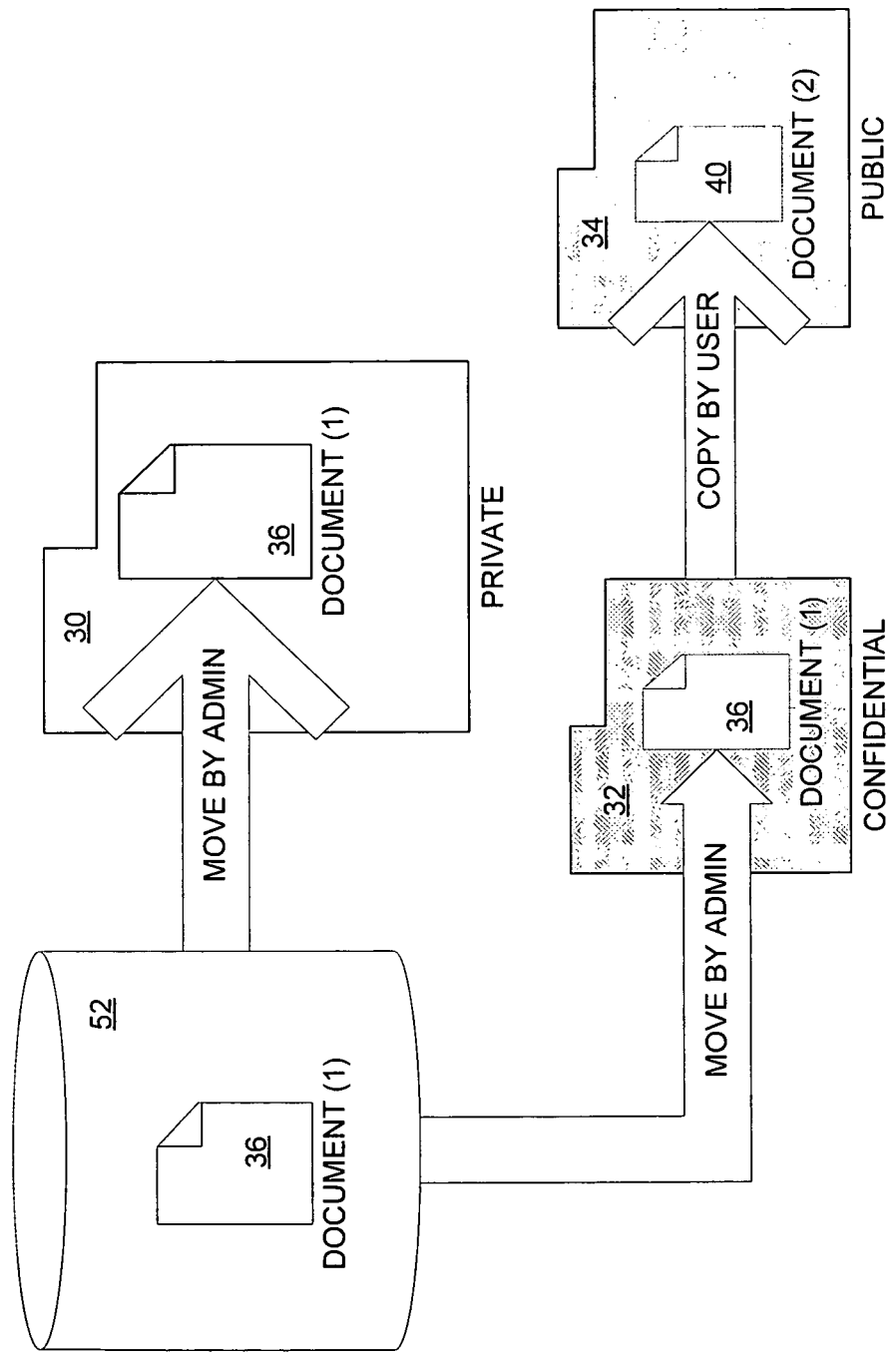
FIG. 10 illustrates allowed document processing by administrator and user according to an example embodiment.

FIG. 10 illustrates allowable document processing according to an example embodiment. A document 36 is first available in a CS repository 52 and is moved by an administrator to a private folder 30. This corresponds to processing illustrated in FIG. 6. The administrator is able to change the location of document 36, and therefore this is an allowable move. Another allowable move is for the administrator to move the document 36 to confidential folder 32. This corresponds to processing illustrated in FIG. 7. The user is not allowed to move the document, and attempts by the user to move or copy the document violates location-based DRM. Note, as illustrated, when a user attempts to copy the document 36 to a public folder 34, the document changes to document 40 as discussed earlier, wherein the original node ID and node ID are no longer consistent. This corresponds to processing illustrated in FIG. 8. As illustrated, the user has fewer privileges than the administrator, as the administrator is allowed to move the document. The move is an authorized operation for the administrator. Copy is not an authorized operation.

Figure 11:
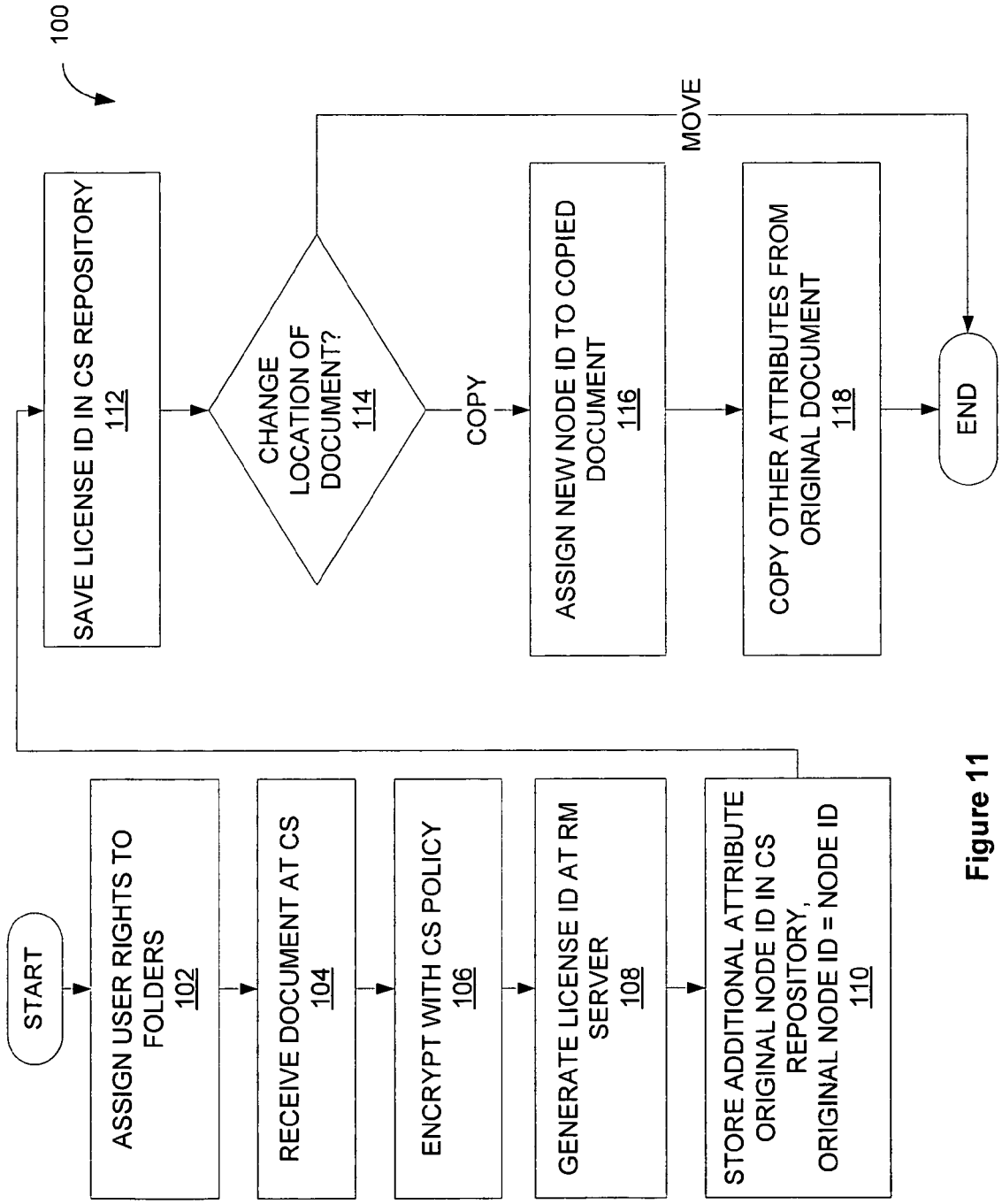
FIG. 11 is a flow diagram illustrating application of location-based digital rights management at a file storage system, according to an example embodiment.

FIG. 11 illustrates a method 100 for file storage management and ACM, or DRM, according to an example embodiment. Initially, an administrator assigns user rights to a plurality of folders, 102. Each of the plurality of folders is considered a node in a hierarchical arrangement, such as in hierarchical tree 70 of FIG. 5B. A file storage system generates an ACL for the node; and configures CS policy to reflect ACL and the folder organization. The CS policy implements ACM by providing instructions to a CS authorizer processing access requests to documents within a file storage system. ACL information is stored at a RM server, When a document is received, 104, the file storage system encrypts the document according to the CS policy, 106. The RM server generates a license ID for the document, 108. The file storage system then stores an additional attribute corresponding to the original location of the document, the original node ID, in the CS repository, 110. At this point, the original node ID is the node ID. The license ID is stored in the CS repository, 112.

Metadata associated with the document may include license ID, server ID, and any other information stored in the document. In one embodiment, metadata includes information which is not encrypted with the document content. Alternate embodiments may include some metadata within the encrypted portion of a document. The encrypted document, along with the unencrypted metadata, is stored in the file storage system, attributes of the encrypted document are stored in the CS repository, and the license is stored in the RM server.

Continuing with FIG. 11, when the document location changes, 114, the method 100 determines if the change is a move by an administrator or a copy by a user. For a move by an administrator, there is no change to the attributes of the document. When the change of document location is a copy by a user, the method 100 assigns a new node ID to the document, 116, and copies other attributes from the original document, 118. In this way, method 100 restricts CS policy rights evaluation to the original location of the document and at the same time un-intrusively allows legitimate movements of such documents.

Figure 12:
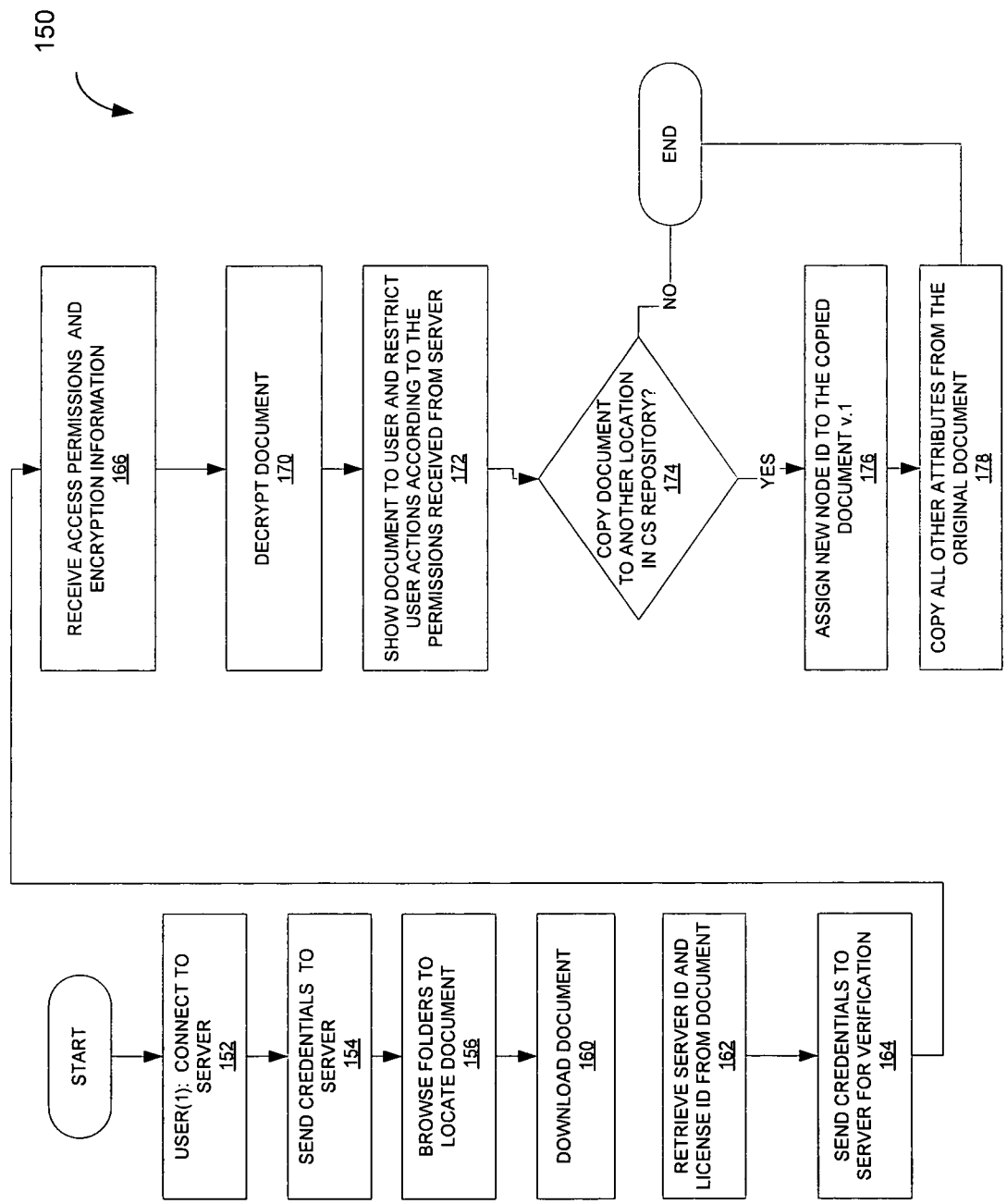
FIGS. 12 and 13 are flow diagrams illustrating application of location-based digital rights management for users in a computing environment, according to example embodiments.

FIG. 12 illustrates a user access to a document according to an example embodiment. In method 150, the user 1 connects to the file storage system 152, which may be a server, and sends user credentials, 154. In one example, the user connects to CS repository 52 (FIG. 10), which provides a web interface allowing the user to browse the folder hierarchy and locate the document. The user 1 then browses folders to locate the document, 156. The document is then downloaded to a client machine 160, wherein the client machine is that of user 1. The client machine is running an application coordinated with operations at the server, and by use of such application the client machine retrieves the metadata from the downloaded document, 162. The metadata includes server ID, and license ID. User 1 may resend user credentials to the server to authorize user 1 to receive the document from the current node or location, 164. When user 1 receives access permissions and encryption information, 166, for opening and processing the documents according to ACL. The application at the device then decrypts the document, 170, and the user is able to client process the document. The application then shows the document to the user, and restricts the user actions according to the permissions received from the server, 172. For read privileges, processing the document may include opening the document and viewing the content.

If user 1 copies the document to another location in the CS repository, 174, the document assigns a new node ID to the copy of the document, 176, and other attributes are copied from the original document, 178. The copied document, identified as document v.1, is encrypted with the CS policy and the metadata will reflect the original node or location of the document. The user 1 may save a version of the document, but if user 1 seeks to move the version of the document to another location, that new location will be identified as an unauthorized location and access to the version of the document at that unauthorized location will be denied.

The application, such as software or firmware, resident on a client machine in an example embodiment is Acrobat® by Adobe, Inc. of San Jose, Calif. The application connects to an application on a server. The client machine connects to the server through a networked connection, such as the Internet.

Figure 13:
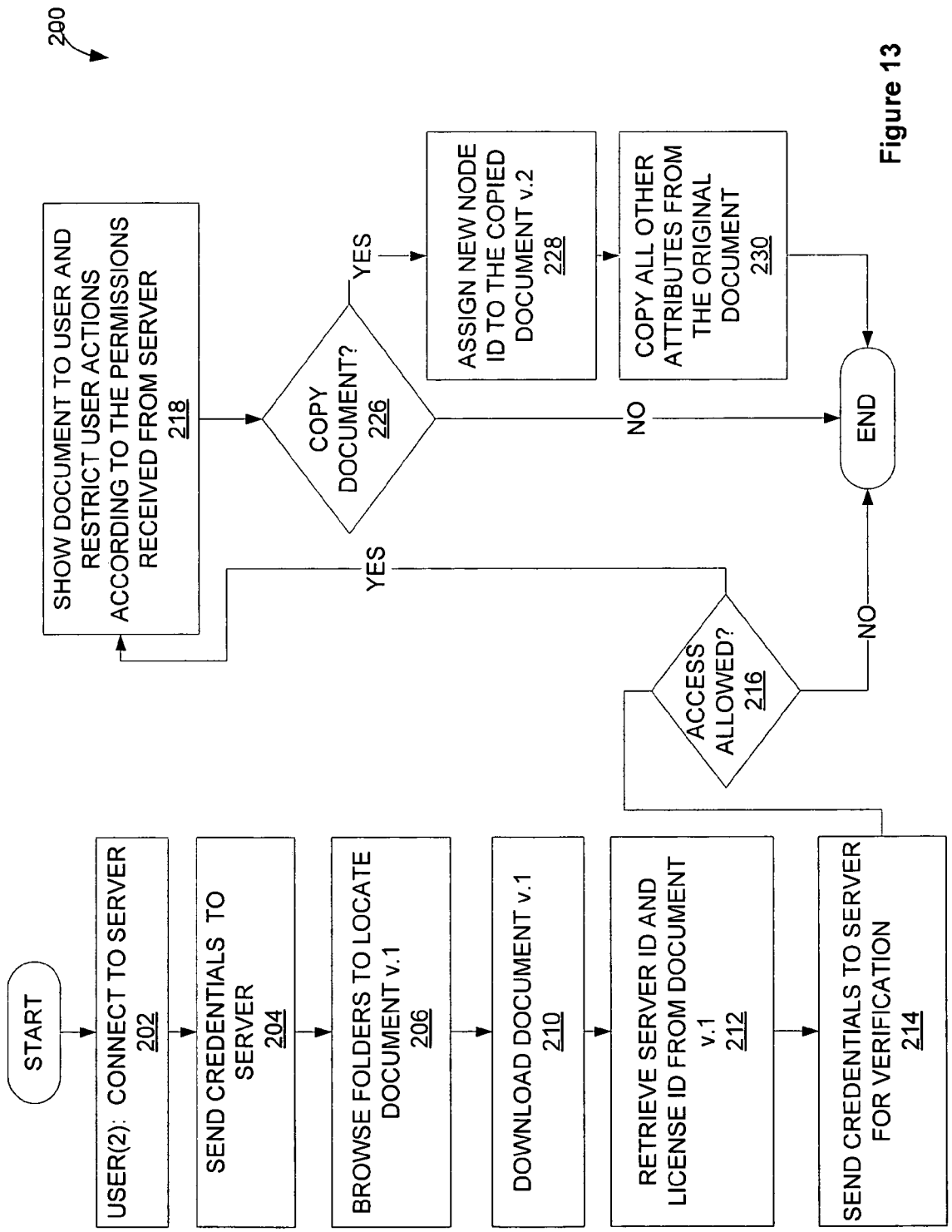

FIG. 13 illustrates a method 200 for user 2 to access a document. User 2 connects to the server, 202, and sends user 2 credentials, 204. User 2 downloads the document v.1 information to the server, 206, and retrieves server information and license information from the metadata of document version 1 (v.1), 212. User 2 may resend, 214, user credentials to the server for authorization to access document version (v.1). The user credentials may be different than the user credentials sent at 204. The method 200 determines if access is allowed for this user to the document, 216. When access is allowed, the application shows the document to the user and restricts user actions according to the permissions received from the server, 218. For the situation where user 1 copied the document to a new location, the original node ID and current node ID are not consistent, and access is denied. For the situation where the administrator moved the document, user 2 may be authorized to access the document, and processing would continue to receive access control information. The access control information including ACL and encryption information. The application on user 2 client machine applies the ACL rules and decrypts document version 1 (v.1). The application determines if the document is to be copied, 226. When user 2 attempts to save a local copy, 226, the copy is encrypted with the CS policy and saved as document v.2. The copied document, document v.2, is assigned a new node ID, 228, and other attributes are applied from the original document, 230. User 2 is then able to process document v.1.

Figure 14:
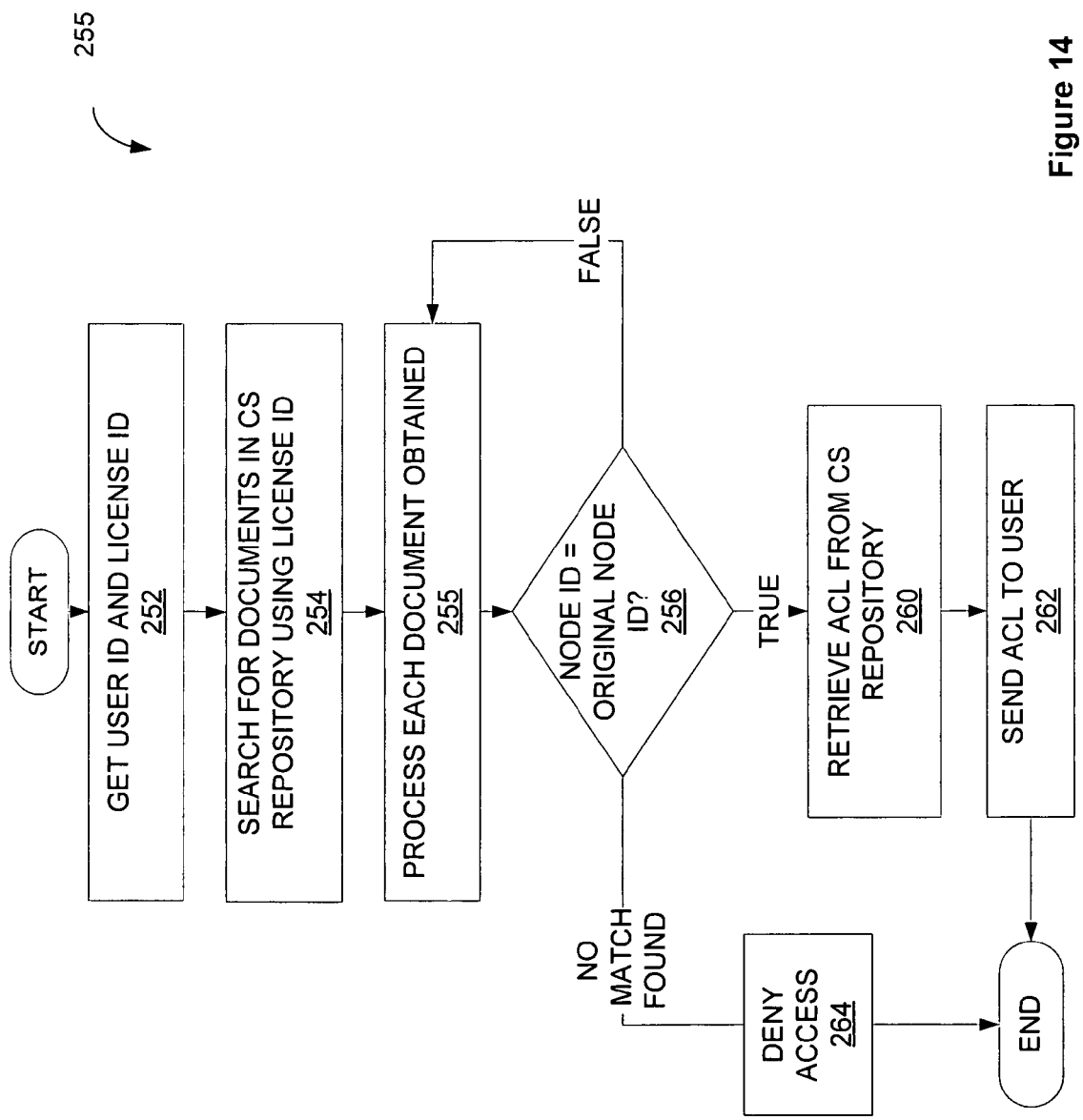
FIG. 14 is a flow diagram illustrating application of location-based digital rights management at a content services authorizer, according to an example embodiment.

FIG. 14 illustrates a method 255 for a server to authorize a requester for access to a document at an authorized location, according to an example embodiment. In one example, the method 255 describes functionality of CS authorizer 68 (FIG. 5A). The method includes getting the user ID and license ID, 252. To allow a user access to a document, the server typically will receive user credentials from the requester. User credentials may include a user ID, a password, or other identification information. The method then involves searching for documents in the CS repository 52 (FIG. 10) using the license ID. The RM server 60 (FIG. 5A) retrieves document attributes from the CS server, 254, and processes each document, 255. A comparison is made of the node ID to the original node ID, 256. When the node ID and original node ID are consistent, access is granted and RM server 60 retrieves ACL and encryption information, 260, and sends this information to the requester, 262. In one example, communication between RM server 60 and client application or software is via Simple Object Access Protocol (SOAP) or other web services protocol. If the node ID is not consistent with the original node ID, access is denied, 264.

A document file format 500 according to an example embodiment is illustrated in FIG. 15. The document file format 500 includes a first portion 502 and a second portion 504. The second portion 504 includes payload 520 and is the portion encrypted by the server. The first portion 502 is not encrypted as part of the document, and is provided as metadata. The first portion 502 includes CS policy ID 506, license ID 508 and server ID 510. Alternate embodiments may include other information as well. Still other embodiments may include other information.

Figure 16:
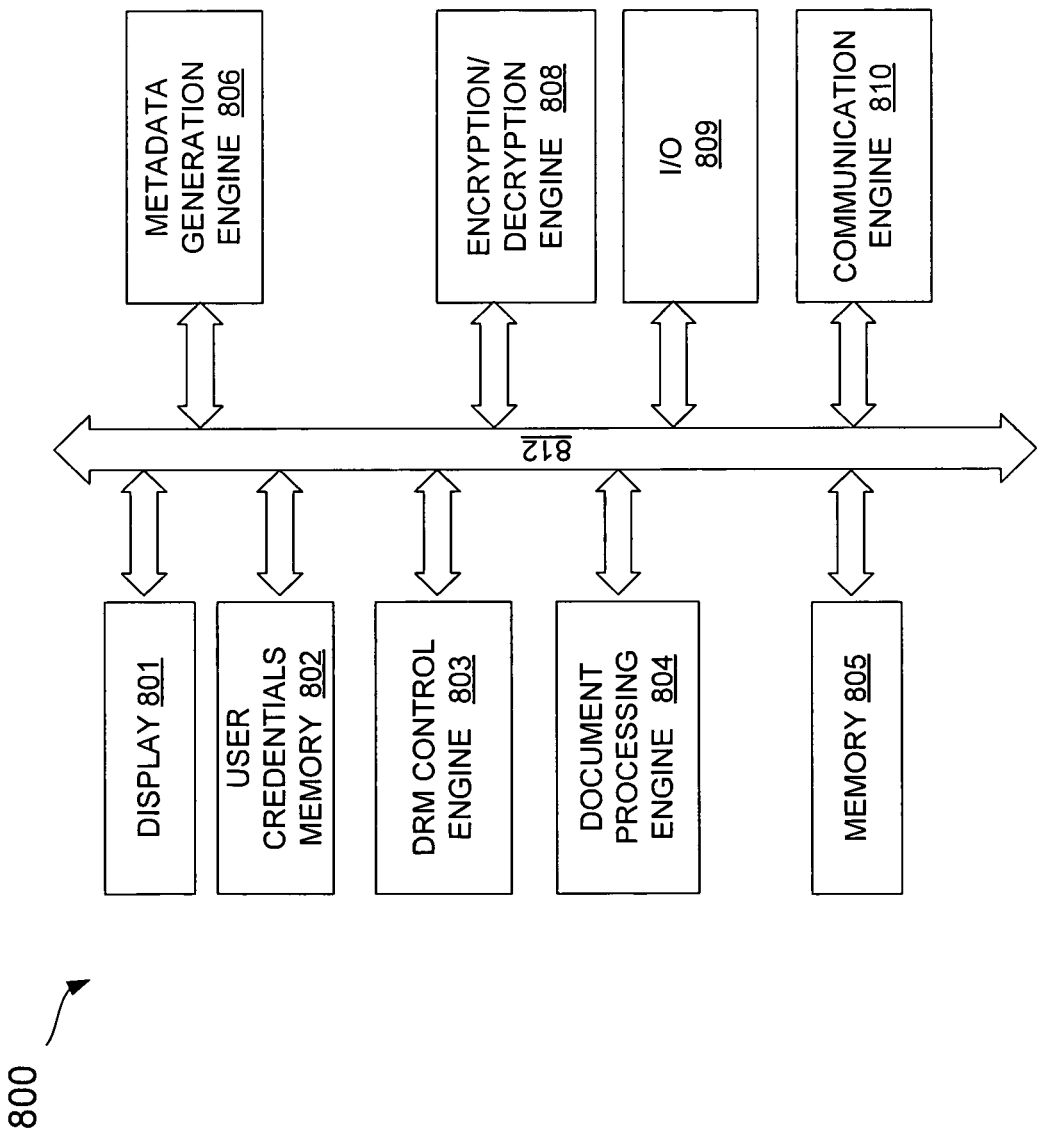
FIG. 16 illustrates a computing system employing location-based digital rights management, according to an example embodiment.

FIG. 16 is a block diagram of an example computer system 800 used to receive and process documents, including documents stored in file storage system 51 (FIG. 5A), to edit and modify documents, to provide updates to documents, to merge different documents and/or different versions of documents, to store documents, to retrieve documents, to track the revision history of documents, and to associate different documents. This processing includes determining link information and dictionary information for documents, as well as other processing described herein. The blocks shown herein may be implemented in software, firmware, or hardware. These blocks may be directly or indirectly communicatively coupled via a physical or logical connection. The computer system 800 may be part of the one or more user devices, such as client machine 4 illustrated in FIG. 1.

The computer system 800 is illustrated having various modules 801 through 810 communicatively coupled to a communication bus 812. Illustrated is a display controller 801 to control display of a document, including interface to a graphical user display. An I/O unit 809 is adapted to receive input selections and commands from the user, wherein the input selections allow the user to specify changes to content, additions, deletions, changes a document, movement of a document, such as to copy or move a document, etc. A received input may specify a request to: i) access a document, ii) change access control privileges for a document, iii) change a location of a document, etc. A received input may initiate transmittal of information to: i) access an application, ii) access a document, iii) provide user credentials, iv) access encryption information, v) access ACL information, vi) download a document, etc. A DRM control engine 803 interfaces with a server, such as file storage system 51, to access an application and a document. DRM control engine 803 provides user credential information, such as stored in user credentials memory 802, identifying a user or requester from system 800. DRM control engine 803 further responds to queries from file storage system 51 and applies ACL and access control rules as provided by files storage system 51 (FIG. 5A).

A document processing engine 804 provides functionality to process the online document, and to process the portable format document. Memory 805 may be used to store the content data, and any other information to be stored at the user machine. Note: user credentials memory 802 and memory 805 may be combined in one memory storage unit, which may be either individual or combined and external to system 800.

System 800 further includes metadata generation engine 806 which extracts metadata from a document, and processes metadata. The software on the client machine retrieves the server ID, including the server URL, and license ID associated with the document and sends information to the RM server 60 along with the user credentials. The RM server 60 (FIG. 5A) determines if the user has access privileges and then sends decryption information to the client machine. The client machine then decrypts the document with the key and any other decryption information received from RM server 60. The client machine then imposes the privileges as in the ACL as received from the RM server 60. The metadata includes server location, such as location of file storage system 51 or CS authorizer 68 (FIG. 5A) or RM server 60. Note, in one embodiment, each component of files storage system 51 may be located at different locations. Similarly, components CS repository 52 (FIG. 10), RM server 60 and CS authorizer 68 may be individually located, or some combinations thereof.

Continuing with FIG. 16, further coupled to the communication bus 812 is an encryption/decryption engine 808, for applying encryption information to decrypt received documents. The encryption/decryption engine 808 is further adapted to encrypt content using encryption information received from a file storage system 51, such as received via communication engine 810. The system 800 sends and receives information through I/O 809 and communication engine 810, which may implement any of a variety of communication protocols.

Some example embodiments may include remote procedure calls being used to implement one or more of the above-illustrated operations or components across a distributed programming environment. For example, a logic level may reside on a first computer system that is located remotely from a second computer system including an interface level. These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

In one example of the system 800 an apparatus includes a computing system for performing operations within a computing environment. The system 800 includes a means for connecting to a content server, a means for requesting a document from an access location within a computing environment, a means for downloading the document, the document encrypted with a content services policy, a means for receiving access control information for the document, wherein the access location corresponds to an authorized location for the document, a means for applying the access control information to decrypt the document, and a means for processing the document.

Still further, in one embodiment the system 800 may include a means for extracting a location of the content server, and a means for sending credentials to the content server. In another embodiment, system 800 includes a means for storing a copy of the document to a second location, wherein the copy is encrypted according to the content services policy and includes metadata identifying the second location as a second access location. In still another embodiment, the computing system 800 further includes a means for requesting access to the copy at the second location, wherein the second location is inconsistent with the authorized location, and a means for receiving a denial of access to the copy.

Figure 17:
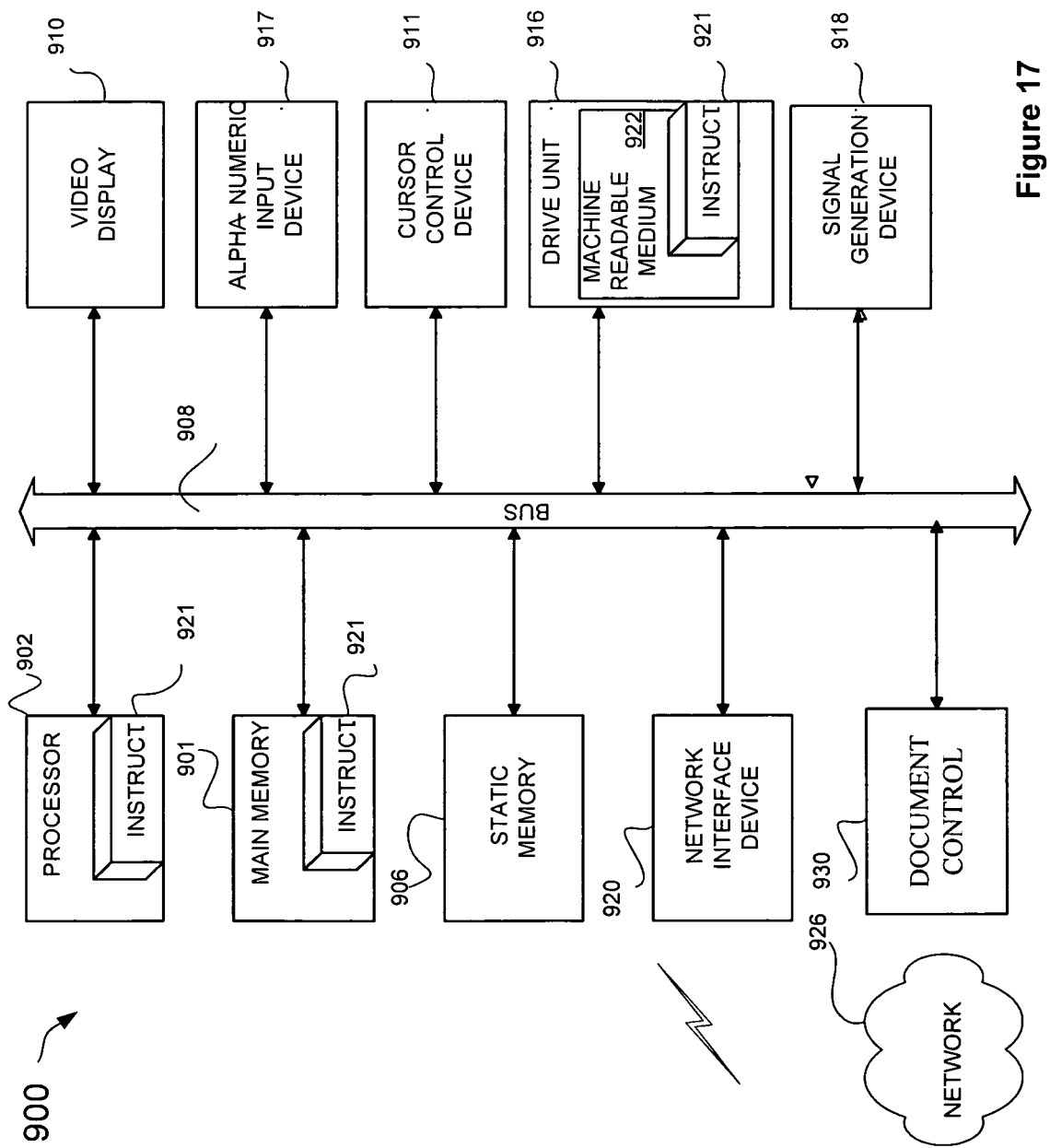
FIG. 17 illustrates a computing environment employing location-based digital rights management, according to an example embodiment.

FIG. 17 illustrates a computing system 900 adapted for operation in a networked computing environment, having at least one machine that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example, computer system 900 includes a processor 902, such as a Central Processing Unit (CPU), a main memory 901, and a static memory 906, which communicate with each other via a bus 908. The computer system 900 may further include a video display unit 910 (e.g., a Liquid Crystal Display (LCD) or a Cathode Ray Tube (CRT)). The computer system 900 also includes an alphanumeric input device 917 (e.g., a keyboard), a User Interface (UI), a cursor controller 911 (e.g., a mouse), a drive unit 916, a signal generation device 918 (e.g., a speaker) and a network interface device (e.g., a transmitter) 920.

The drive unit 916, which may be disk drive unit, includes a machine-readable medium 922 on which is stored one or more sets of instructions and data structures (e.g., software 921) embodying or used by any one or more of the methodologies or functions described herein. The software instructions 921 may also reside, completely or at least partially, within the main memory 901 and/or within the processor 902 during execution thereof by the computer system 900, the main memory 901 and the processor 902 also constituting machine-readable media.

The software instructions 921 may further be transmitted or received over a network 926 via the network interface device 920 using any one of a number of well-known transfer protocols (e.g., Hyper Text Transfer Protocol (HTTP), Secure Hyper Text Transfer Protocol (HTTPS)).

A document control module 930 implements the methods and functions described herein. The document control module 930 may be implemented in software, hardware, firmware or a combination thereof. The document control module 930 may contain user application control, server application control, or a combination of at least parts of both user application control and server application control. The document control module 930 may enable the computer system 900 to acts as user, a server or a combination of both.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media. In one embodiment, techniques may be implemented by transmissions on carrier wave signals.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Embodiments may, for example, be implemented as a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

The one or more processors may also operate to support performance of the relevant operations in a "cloud computing" environment or as a "Software as a Service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

In some example embodiments, the system and method as illustrated herein may be used to validate documents, where the authentication of the content of the document and the author of the document may be part of document processing. This document may be, for example, a university transcript, birth certificate, or other suitable document.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the foregoing detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the foregoing detailed description are presented in terms of processes, algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A computer-implemented method, comprising:
receiving a request to access a document, the request associated with a first access node identifier, the first access node identifier indicating a current storage location of the document within a repository;
retrieving document attribute information associated with the document from a content services server, the document attribute information including an authorized node identifier assigned to the document, the authorized node identifier identifies a storage location of the document within the repository, the storage location having access privileges;
comparing, using at least one processor coupled to a memory, the authorized node identifier to the first access node identifier;
denying access to the document in response to determining a discrepancy between the authorized node and the first access node based on a result of the comparing; and
providing access to the document in response to determining that the authorized node identifier and the access node identifier are consistent, based on a result of the comparing.

2. The method as in claim 1, comprising:
receiving credential information associated with the request;
comparing the credential information to an access control list for approval; and
authorizing the request for the document and downloading the document in response to the request based on approval of the credential information.

3. The method as in claim 1, comprising:
assigning an original node identifier associated with the authorized node in the file storage system, the authorized node having access rights associated with at least one user; and
storing the original node identifier in memory storage in the content services server.

4. An apparatus, comprising:
at least one processor coupled to a memory;
a content services repository to store a plurality of documents, each document from the plurality of documents associated with an authorized node identifier, the authorized node identifier associated with an authorized node in the repository;
a content services authorizer to:
compare, using the at least one processor, the authorized node identifier of a document from the plurality of documents and an access node identifier, the access node identifier associated with a current location of the document in the repository, and
verify a request to access the document from an access node associated with the access node identifier; and
a rights management server to provide access control information in response to the verified request.

5. The apparatus as in claim 4, wherein the access control information includes encryption information for decrypting the document.

6. The apparatus as in claim 4, wherein the rights management server comprises a license database and an access control list, the access control list identifying at least one user having access privileges for the authorized node.

7. The apparatus as in claim 4, wherein the content services authorizer is further adapted to deny the request based on an inconsistency between the access node identifier and the authorized node identifier.

8. A computer-implemented method, comprising:
receiving a request to access a document stored at a location within a file store;
retrieving document attribute information associated with the document, the document attribute information including:
a first node identifier assigned to the document identifying a first location within the file store; and
a second node identifier assigned to the document identifying a second location within the file store;
comparing, using at least one processor coupled to a memory, the first node identifier to the second node identifier;
denying access to the document in response to determining a discrepancy between the first node identifier and the second node identifier based on a result of the comparing; and
retrieving access control information in response to determining that the first node identifier and the second node identifier are consistent, based on a result of the comparing.

9. The computer implemented method of claim 8 wherein the first node identifier identities a prior storage location of the document and wherein the second node identifier identifies either a prior storage location of the document or a current storage location of the document.

10. The computer implemented method of claim 8 wherein the second node identifier is updated to be a current storage location of the document within the file store when the document is moved from a prior storage location of the document within the file store to the current location of the document within the file store.

11. The computer implemented method of claim 8 wherein the second node identifier retains its current value when the document is moved from a prior storage location of the document within the file store to the current location of the document within the file store.

12. An apparatus, comprising:
a processor coupled to a memory;
a document store to store a plurality of documents, each document having a first attribute containing a first storage location within the document store and a second attribute containing a second storage location within the document store;
a content services authorizer to:
compare, using the processor, the first attribute of a document from the plurality of documents to the second attribute of the document from the plurality of documents; and
verify a request to access the document when the first attribute is consistent the second attribute; and
a rights management server to provide access control information in response to the verified request.

13. The apparatus of claim 12 wherein the first attribute contains an original storage location of the document within the document store and wherein the second attribute contains a storage location within the document store where the document is authorized to reside.

14. The apparatus of claim 12 wherein the first attribute contains an original storage location of the document within the document store and wherein the second attribute contains a storage location within the document store where the document is not authorized to reside.

* * * * *